United States Patent [19]

Bitting et al.

[11] Patent Number: 4,494,055
[45] Date of Patent: Jan. 15, 1985

[54] CONTROL CIRCUIT FOR AN ELECTRONICALLY COMMUTATED MOTOR INCLUDING REVERSING; METHOD OF OPERATING AN ECM INCLUDING REVERSING

[75] Inventors: Ricky F. Bitting, Raleigh, N.C.; William Peil, North Syracuse; Thomas A. Brown, Fulton, both of N.Y.

[73] Assignee: General Electric Company, Fort Wayne, Ind.

[21] Appl. No.: 502,594

[22] Filed: Jun. 9, 1983

[51] Int. Cl.³ .............................................. H02P 6/02
[52] U.S. Cl. .................................. 318/254; 318/138; 318/439
[58] Field of Search .................. 318/138, 254 A, 254, 318/439, 257, 254

[56] References Cited

U.S. PATENT DOCUMENTS

| | | | |
|---|---|---|---|
| Re. 31,229 | 5/1983 | King | 318/254 X |
| 3,611,081 | 10/1971 | Watson | 318/138 |
| 3,887,856 | 6/1975 | Cicchiello | 318/416 X |
| 3,906,320 | 9/1975 | Doeman | 318/254 A X |
| 3,989,992 | 11/1976 | Schmidt | 318/257 |
| 4,005,347 | 1/1977 | Erdman | 218/254 |
| 4,162,435 | 7/1979 | Wright | 318/138 |
| 4,164,697 | 8/1979 | Everett | 318/138 X |
| 4,169,990 | 10/1979 | Erdman | 318/138 |
| 4,172,990 | 10/1979 | Everett et al. | 318/138 X |
| 4,208,621 | 6/1980 | Hipkins et al. | 318/138 |
| 4,258,299 | 3/1981 | Takeda et al. | 318/254 A X |
| 4,262,237 | 4/1981 | Gelenius | 318/439 X |
| 4,295,080 | 10/1981 | Fujita et al. | 318/257 |
| 4,348,621 | 9/1982 | Hyldal | 318/138 X |
| 4,403,177 | 9/1983 | Weber et al. | 318/138 X |
| 4,413,211 | 11/1983 | Fowler | 318/257 |

OTHER PUBLICATIONS

RCA, Transistor Thyristor & Diode Manual, RCA 1969, pp. 43-44.
Integrated Electronics Analog and Digital Circuits and Systems, Millman and Halkias, Chap. 13, pp. 408-445.
VLSI Design, "Digital Auto-Zeroing Extends the Capabilities of Semi-Custom and CMOS Operational Amplifiers", Richard Kash, pp. 58, 59, Mar./Apr. 1982.

Primary Examiner—J. V. Truhe
Assistant Examiner—Bentsu Ro
Attorney, Agent, or Firm—Ralph E. Krisher, Jr.

[57] ABSTRACT

In a motor control circuit for an electronically commutated reversible motor used in a ceiling fan, a control is used to reduce the voltage supplied to the motor for variable speed or torque operation. At the same time, a substantially smooth control voltage, dependent on the variable voltage supplied to the motor, is produced. This control voltage, which is used to enhance the adjustment rate, is applied to control a pulse width modulator, which produces output pulses which also control the flow of energy to the motor. When the control voltage reaches a value slightly past the desired minimum speed or torque setting, a signal is generated to change the direction of motor rotation. Means are provided to delay the actual reversal to protect the power switches in the control circuit. When power is first applied, the initial direction of motor rotation is set by a switch on the ceiling fan. The control circuit permits control of motor reversal from a wall location. The control circuitry is designed for use in a maximally integrated ECM control circuit. The invention also concerns a method of controlling an ECM, including reversal, and reversal combined with torque or speed control.

25 Claims, 22 Drawing Figures

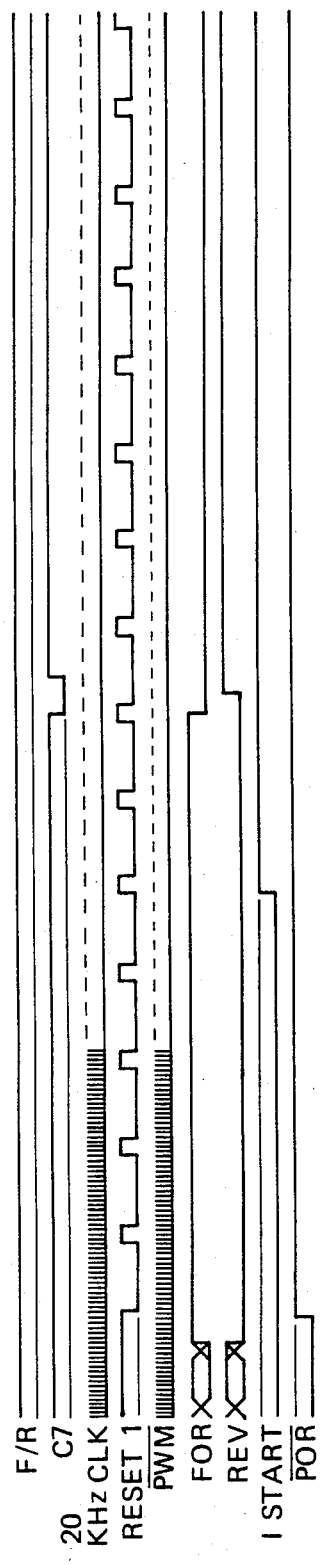
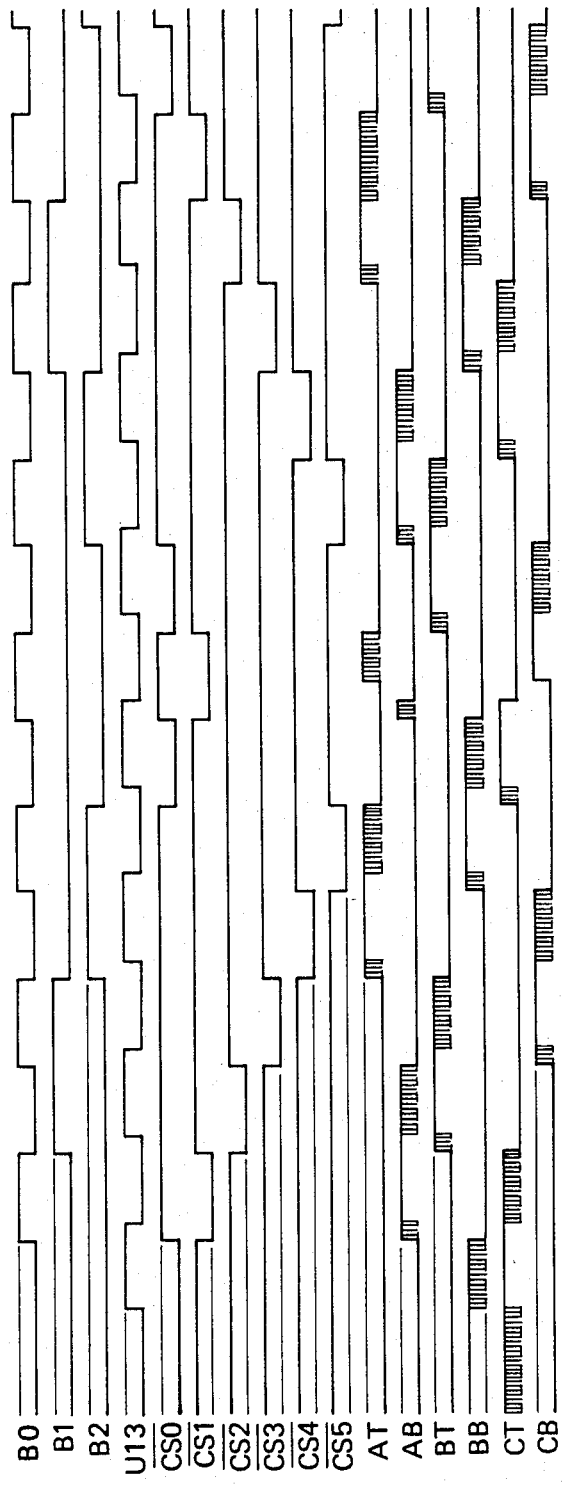
FIG. 3

EQUIVALENT REPRESENTATION
FOR TRANSCONDUCTANCE AMP

TRANSCONDUCTANT AMP WITH
CURRENT SERIES FEEDBACK

FIG. 7 AUTONULL CIRCUIT 143

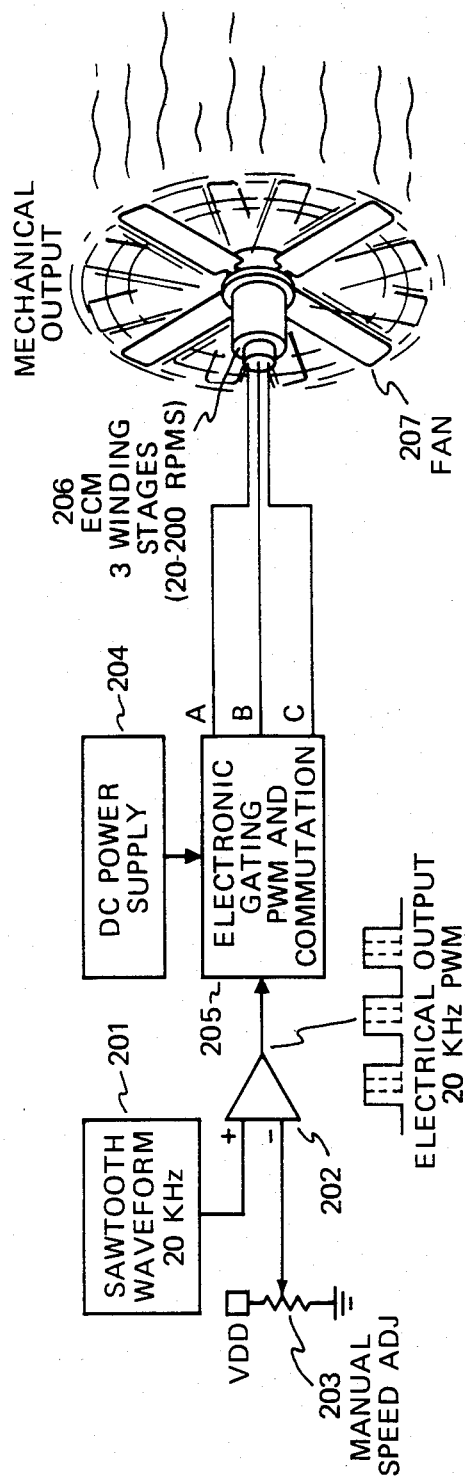
FIG. 10E
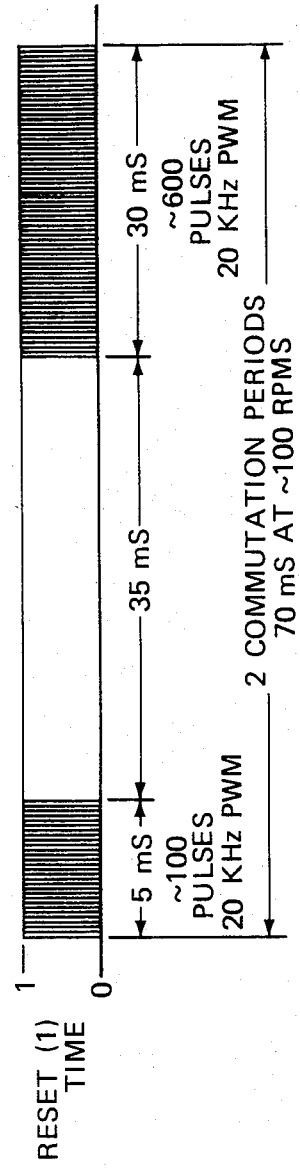
FIG. 10F 'AT' WAVEFORM

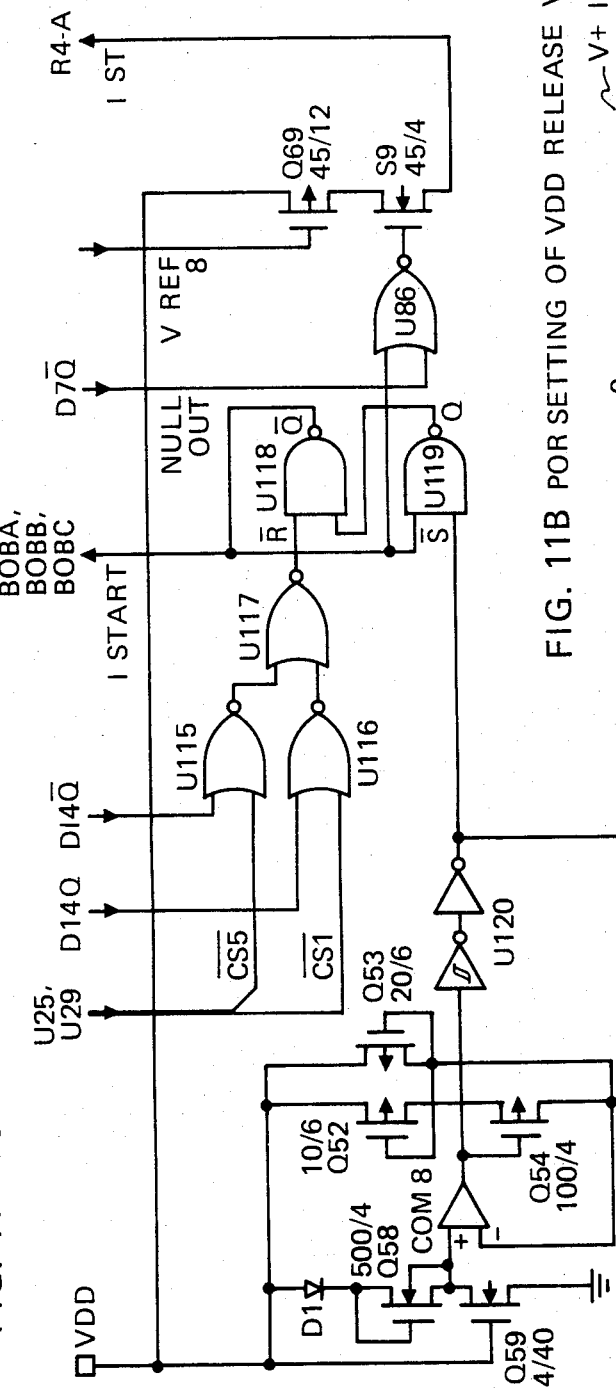
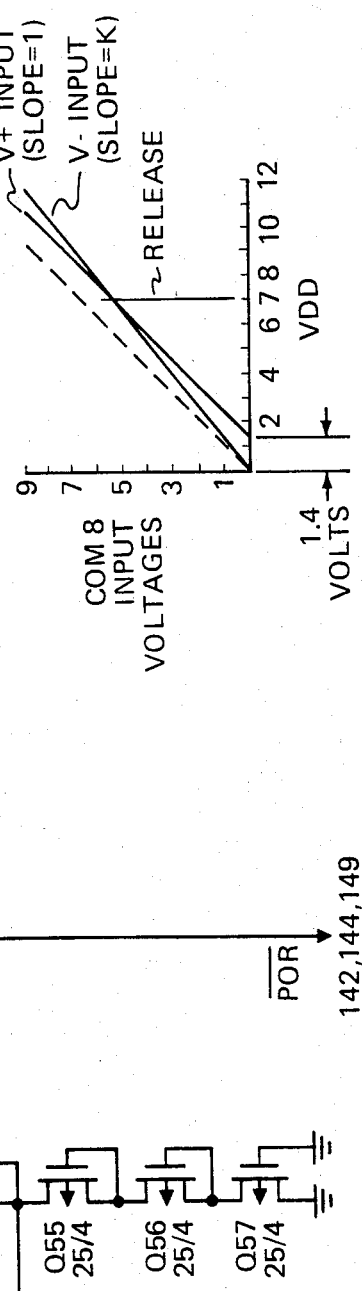
FIG. 11A POR 150
FIG. 11B POR SETTING OF VDD RELEASE VOLTAGE

CONTROL CIRCUIT FOR AN ELECTRONICALLY COMMUTATED MOTOR INCLUDING REVERSING; METHOD OF OPERATING AN ECM INCLUDING REVERSING

CROSS REFERENCE TO RELATED APPLICATIONS

This application is related to the following commonly assigned applications: Ricky F. Bitting application Ser. No. 502,663, filed June 9, 1983; Ricky F. Bitting and William Peil application Ser. No. 503,599, filed June 9, 1983; and Ricky F. Bitting, William Peil, Thomas A. Brown, William K. Guzek application Ser. No. 602,601 filed June 9, 1983. The entire disclosures of the foregoing are specifically incorporated herein by reference.

BACKGROUND OF THE INVENTION

1. Field of the Invention

This invention relates in general to domestic appliances powered by an electronically commutated motor (ECM) a method of operating an ECM and more particularly to methods of reversing and controlling the speed or torque of an ECM. The invention further relates to control circuits for ECMs suited to fabrication in solid state electronic form to a large degree utilizing monolithic integrated circuitry, and to an ECM powered variable speed fan incorporating such control circuitry.

2. Description of the Prior Art

Control circuits for electronically commutated motors have hitherto been fabricated using discrete electronic components, and yet the desirability of fabricating such control circuits in solid state electronic form, to a large degree utilizing monolithic integrated circuitry, is widely honored in discussions among electrical industry spokesmen if not by an equally wide presence of products incorporating such monolithic integrated circuitry in the actual market place.

The electrically commutated motors for which such control circuitry would have application is exemplified by those ECMs disclosed in U.S. Pat. Nos. 4,005,347 and 4,169,990 to David M. Erdman, and U.S. Pat. No. 4,162,435 to Floyd H. Wright. These motors are characterized by having a multistage winding assembly, and a magnetic assembly, the two arranged for mutual relative rotation, the motor in a given state of a multistate energization sequence, having an unenergized winding stage in which an induced back emf appears, which when integrated over time to a predetermined value indicates the instant at which the mutual relative angular position has been attained suitable for commutation to the next state. In the most common examples, the multistage winding assembly is stationary, with the magnetic assembly arranged within the winding assembly, and arranged to rotate with respect to the immediate environment by means of bearings attached to a frame, mechanically common with the winding assembly. The mechanically opposite arrangement in which the winding assembly rotates within the magnetic assembly is less common, but makes many of the same requirements of the control circuitry, and in general the control circuitry has equal application to such motors. In addition, the more common, magnetic assembly in such motors is a permanent magnetic assembly. However, an arrangement in which the magnetic assembly is electromagnetic makes many of the same requirements of the control circuitry, and in general, the control circuitry has equal application to such motors.

The common requirements of the control circuitry for electronically commutated motors, may be divided into four categories, which in a sense, place differing requirements upon their fabrication. The appliance is installed in the house, and controls located when practical in the appliance, and when not practical, located at wall locations convenient to the user. In the practical case of a combined ceiling fan, lighting fixture, which is the practical product exemplified herein, the "fan" includes a motor, a light and user operated controls for the same. The controls are both integral with the lighting fixture and remote. The remote control may be located upon a convenient wall location and it may embody largely duplicate user operated controls. The usual functions of the user operated controls include turning on or turning off the fan or light, regulating the intensity of the light, regulating the speed of rotation, or direction of rotation of the fan.

The user operated controls, particularly those on the wall controls, are themselves constructed similarly to other wiring devices used in the home, and they are interconnected by electrical cable typical of the customary 110 AC house wiring. In general, the requirement placed upon such "control systems" is that the interconnections be minimal, and if possible not require additional special wiring. Ideally, the wiring installation would permit complete communication within the "control systems" by the minimum two wire cable. Ideally, the user operated control circuitry exemplified herein should require no more than two wires between the wall control, the fixture, and the house wiring for minimum installation. expense. In this category, the control circuit is fabricated in the form typical of house wiring systems.

A second category of electrical control circuit fabrication is utilized within the enclosure of the ceiling fixture or of the wall control. This usually is "point to point" wiring, and the electrical connections are made with mechanical bonds, including solder, rivets, or electrical terminals. Here, the stress is often upon compactness, and ease of on-site assembly.

A third category of electrical control circuit fabrication, which is often practiced in the fixture itself or in the wall control, is that which is usually performed in the factory, and which is called "printed circuit board" (PCB) wiring. This wiring is of moderate density, and allows for ampere level currents, voltages in excess of the customary house level voltages (120–240, etc.), and heat dissipation levels comparable to the needs of the customary home appliances. This wiring is used to interconnect—by a factory process, discrete electronic components, such as resistors, capacitors, inductors, discrete solid state devices, such as transistors, diodes, diacs, triacs, SCRs, etc. on the printed circuit board.

When the control application of the control circuitry is as complicated as the provision of electronic commutation of an ECM motor and the imposition of user operated controls, and automatic protection functions incidental to user operated controls, then the complexity of the control function required of the control circuitry tends to transcend the practical limits of fabrication by the assembly of discrete electrical components upon a printed circuit board. In the printed circuit mode of fabrication for such control circuitry, the volume weight, and costs of printed circuit fabrication are greater by a factor of at least a hundred, and often by a factor of a thousand times the comparable measure of a circuit of monolithic integrated circuit fabrication of like complexity.

The thrust of these practical considerations upon control circuit fabrication is to perform all of the control functions that can be performed, taking into account the limitations on allowable current levels, voltage levels and power dissipations, with monolithic integrated circuitry.

Present day limitations upon the application of integrated circuitry are less restrictive than some time ago, and more restrictive than one would expect some time in the future. In general, circuitry complexity required for the control function herein contemplated can be handled with MSI (Medium Scale Integration) or LSI (Large Scale Integration). In the usual case, the component count of the motor control system is on the order of $10^2$ to $10^3$.

The current, voltage and power dissipations ordinarily dictate special interfacing circuits between the monolithic integrated circuit and the user operated controls, the motor, the light and the power mains. In general, this dictates that voltages applied to the IC not exceed the voltage rating of the integrated circuit process, typically from 5 to 40 volts, that currents should not exceed tens of milliamperes and that power dissipation not exceed 100s of milliwatts. Because of voltage limitations, it is necessary to use voltage dividers coupled to the winding stages of the motors to reduce the back emf sensed on the winding stages to several volts (e.g. about 3 volts) before application to the integrated circuit. Similarly, the control of power to the winding stages of the motor requires current and power dissipation levels that can only be performed by discrete solid state switches. The integrated circuit, accordingly, has terminal pads supplied by internal drivers, with the power to control either directly or through additional buffers, the solid state power switches energizing the winding stages of the motor. A similar practical problem relates to the non-integrable components, which are primarily large capacitors, inductors, and the user operated controls. These may usually be coupled to the pads of the monolithic integrated circuit with no other transition than the terminal pads of the integrated circuit and a demountable 16 pin connection on the printed circuit board.

There is a need to use a standard package with ICs in order to keep the cost minimum. This is typically 16 pins. There is also a need to keep outboard of the IC, components which control parameters which may change from product to product such as the inertia of the fan blades. In other words, the IC must be able to adapt to expected changes and must use a standard low cost package. Some components which could be integrated are sometimes not put in the IC for these good engineering reasons.

To date, "maximally" monolithically integrated control circuits for electronically commutated motors are not in common use in the market place.

SUMMARY OF THE INVENTION

Accordingly, it is an object of the present invention to provide a maximally monolithically integrated control circuit for an electronically commutated motor.

It is another object of the invention to provide an improved control circuit for an electronically commutated motor.

It is still another object of the invention to provide an improved circuit for reversing an electronically commutated motor.

It is an additiona object of the invention to provide an improved control circuit for an electronically commutated motor combining reversal of the motor with speed/torque control.

It is a further object of the invention to provide a circuit for reversing an electronically commutated motor providing economical remote control.

It is another object of the invention to provide a circuit for reversing an electronically commutated motor providing means for protecting the power switches during reversal.

It is an additional object of the present invention to provide an maximally integrated control circuit for an electronically commutated motor, providing economical remote control of motor reversal.

It is a further object of the invention to provide an improved method of reversing an electronically commutated motor.

It is another object of the invention to provide an improved method of control of an electronically commutated motor combining reversing with speed/torque control.

These and other objects of the invention will be dealt with in the description which follows. They are achieved in a motor control circuit for an electronically commutated motor adapted to be energized from a power source, said motor having a multistage winding assembly, and a magnetic assembly, the two arranged for mutual relative rotation. In a given state of a multistate energization sequence, the motor has an unenergized winding stage in which an induced back emf is integrated over time to determine the instant at which the mutual relative angular position has been attained suitable for commutation to the next state of the sequence. In each state of the sequence at least one other winding stage is energized in the appropriate sense to cause relative rotation. In the practical example herein treated, one sequence is designed for clockwise operation and a second sequence for counter clockwise operation.

The control circuit combines a first adjustable voltage reduction means for serially connecting the motor to the power supply to provide a variable output voltage suitable for variable speed or torque operation; with means for producing a substantially smooth control voltage, dependent on the variable output voltage. The control voltage, upon passing through an intermediate value corresponding to a useful limit of the adjustable means, continues monotonically toward a final value. Means are provided responsive to a value of said control voltage between the intermediate and final values for generating a signal for control of the direction of motor rotation.

Preferably, the intermediate value of control voltage corresponds to the desired minimum motor speed or torque, typically when the motor stalls in a ceiling fan application, and the change in direction occurs past stalling toward the minimum output voltage.

In accordance with a further facet of the invention, the rate of downward adjustment of energy per unit change in output voltage is enhanced by means of a pulse width modulator also responsive to the control voltage. The pulse width modulator produces output pulses of constant repetition rate, the repetition rate being high in relation to the commutation rate, but with variable on times under the control of the control voltage. The energy, which is supplied to the motor during the active on times of the pulses, is thus reduced when a reduction in output voltage occurs, both by virtue of the voltage reduction, and by virtue of a reduction in the average time that the voltage is applied (i.e., the width of the PWMed pulses controlling energy supplied to the motor are concurrently reduced).

In effecting the desired range of speed or torque control, with a higher voltage at the minimum desired setting (i.e., the motor stall setting) it becomes possible to energize the control circuit through a voltage dropping network connected in parallel with the motor circuit. This then facilitates remote control operation, in that a simple wall control can achieve full range control of the motor speed or torque, and at the minimum setting effect a reversal also remote.

In the preferred embodiment, the motor direction control logic has two outputs, one for facilitating forward operation (clockwise rotation) by means of an active high in the output state, and the other facilitating reverse operation (counter clockwise rotation) by means of an active high in the output state. The internal logic precludes the output states from being active simultaneously, and when a state is changed, delaying the appearance of the new active state, after discontinuance of the prior active state, by a time long enough to protect the power switches. This period is typically in excess of the period of one pulse of the modulator.

The motor direction may be controlled by a switch coupled to the direction control logic, and normally on the fixture incorporating the fan. This switch, in accordance with a further facet of the invention functions with a protective circuit active during power up and power down to determine the motor direction when power comes back on after an interruption.

In accordance with a further aspect of the invention, a novel method of controlling an electronically commutated motor is disclosed. The steps entail reducing the output voltage supplied to the motor through a range of values suitable for variable speed or torque operation, producing a substantially smooth control voltage, dependent on the variable output voltage, the control voltage, upon passing through an intermediate value corresponding to a minimum useful reduction, continuing monotonically toward a final value, and generating a signal for changing the direction of motor rotation at a value of the control voltage between said intermediate and final values.

In accordance with a further aspect of the inventive method the rate of downward adjustment of energy per unit change in output voltage supplied to the motor is enhanced and the range of voltage reduction required for the desired minimum setting (e.g., motor stalling) reduced by means of a pulse width modulator. The pulse modulator, produces output pulses whose "on" time also controls the rate at which energy is supplied to the motor.

As a further variation of the inventive method, the generation of a signal for motor reversal entails first generating a signal for suspending the energization for motor rotation in one sense, and after a short interruption for protection of the motor switches, generating a signal for motor rotation in an opposite sense.

BRIEF DESCRIPTION OF THE DRAWINGS

The novel and distinctive features of the invention are set forth in the claims appended to the present application. The invention, itself, together with further objects and advantages thereof, may best be understood by reference to the following description and accompanying drawings described below.

FIG. 2 is a wiring diagram of a printed circuit board, including the interconnections with the fan motor, the ceiling light, the manual controls and a custom integrated circuit for motor control.

FIG. 3 illustrates the control and commutation waveforms of the motor control integrated circuit.

FIGS. 5A, 6, 7, 9, 10A and 11A are logic diagrams and/or circuit diagrams of the functional blocks for the motor control integrated circuit.

FIG. 5A is a logic diagram of the Input Gating and a circuit diagram including device parameters of the Integrating Transconductance Amplifier blocks of FIG. 4. FIG. 5B illustrates a slightly extended and slightly simplified circuit of the Integrating Transconductance Amplifier including the input connections to an exemplary winding stage and the nulling resistances also treatable as a part of the Autonull circuit; FIG. 5C illustrates an equivalent circuit representation of the Integrating Transconductance Amplifier (without feedback); and FIG. 5D illustrates the equivalent circuit representation of the Amplifier employing series current feedback for stabilizing the amplifier transconductance, a mode of feedback comparable to that herein employed.

FIG. 6 is a logic diagram of the Comparator Network and of the Modulo 6 Counter blocks of FIG. 4.

FIG. 7 is a circuit diagram including device parameters in part and a logic diagram in part of the Autonull Circuit block of FIG. 7.

FIG. 9 is a logic diagram of the Control Logic and Output Drivers blocks of FIG. 4.

FIG. 10A is a combined circuit and logic diagram of the Oscillator, Pulse Width Modulator and the Forward/Reverse Logic blocks of FIG. 4.

FIG. 10E is a block diagram illustrating an open loop pulse width modulation motor control arrangement according to the present invention.

FIG. 10F is a detailed representation of one of the motor control waveforms of FIG. 3.

FIG. 11A is a circuit diagram including device parameters in part and a logic diagram in part for the Power On Reset block of FIG. 4; FIG. 11B is a graph illustrating the setting of the release voltage of the Power On Reset block.

FIG. 12B deals with overall operation during the power on sequence.

DESCRIPTION OF THE PREFERRED EMBODIMENT

COMBINED LAMP AND CEILING FAN FIXTURE USING ELECTRONICALLY COMMUTATED DC MOTOR

Figure 1:
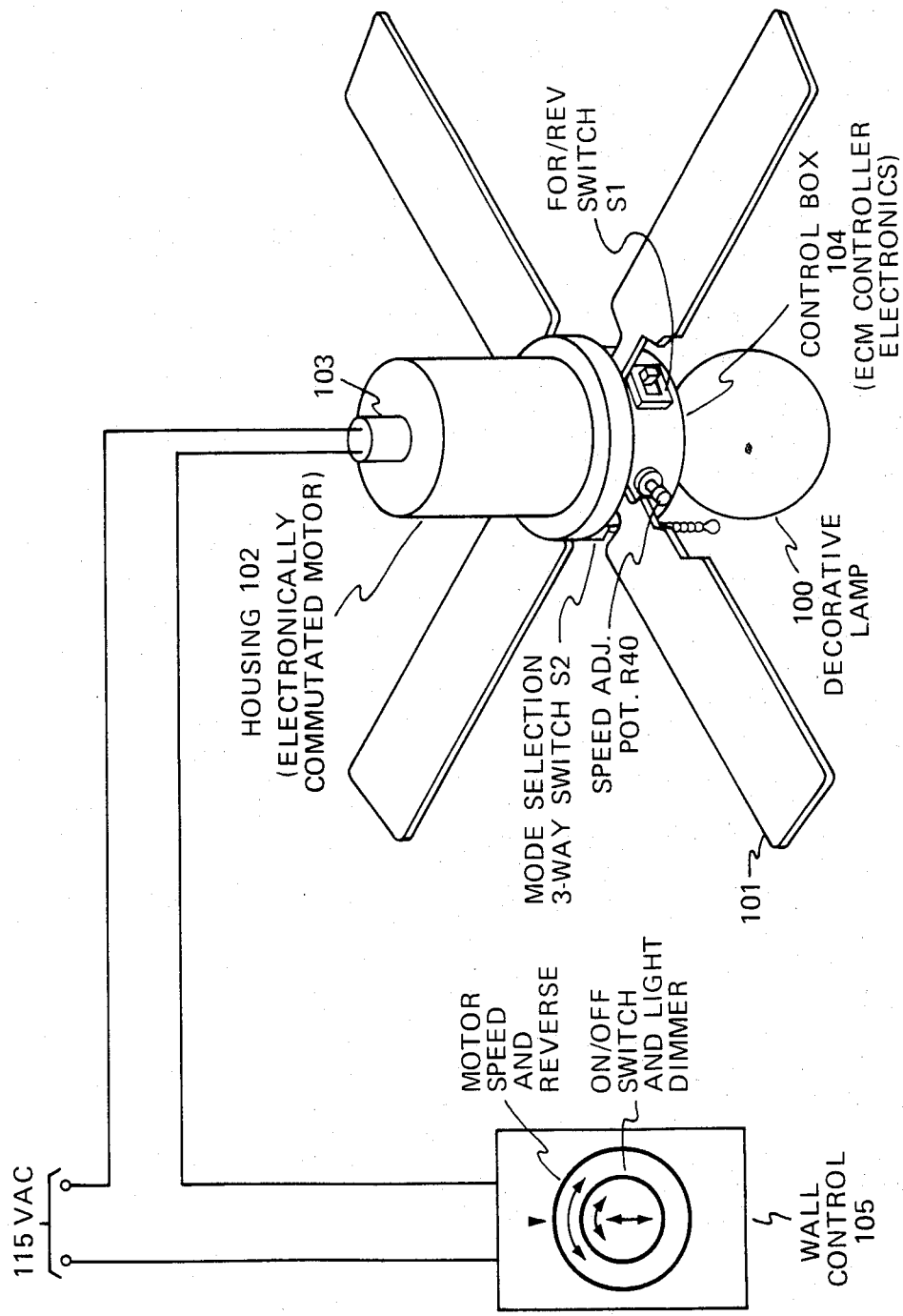
FIG. 1 is an illustration of the installation of a ceiling fixture combining a fan and a light, and including manual controls, the ceiling fan being designed to be driven by an electronically commutated dc motor.

Referring now to FIG. 1, an installation of a combined lamp 100 and ceiling fan 101 fixture is shown, together with the appropriate manual controls. The fan motor, which is housed in housing 102, is, in this embodiment, an electronically commutated dc motor (ECM) driving the 4-bladed fan. A stationary assembly of the motor comprises a ferromagnetic stator having a multi-stage winding arrangement associated therewith which includes a plurality of stages, each in turn formed of a plurality of coils inserted into a plurality of slots spaced about a core of the stator. A rotatable assembly of the motor is arranged in selective magnetic coupling relation with the winding stages of the stator and comprises a rotor having a plurality of permanent magnet elements disposed thereon.

Although a specific ECM is illustrated herein for purposes of disclosure, it is contemplated that other types of ECMs having various other constructions and electrical characteristics may be utilized within the scope of the invention. For example, some of the ECMs which may be utilized are disclosed in U.S. Pat. Nos. 4,005,347 and 4,169,990 to David M. Erdman, and U.S. Pat. No. 4,162,435 to Floyd H. Wright.

The connections to the motor traverse a hollow shaft in the motor permitting a stationary tube to carry wires between a conduit pipe 103, mounted on the upper surface of the motor housing 102 and a control box 104 supported upon the under surface of the housing. The conduit pipe 103 may be used to carry wires to a connection box (not shown) mounted on the ceiling. The conduit pipe 103 may also support the fixture. The control box 104 contains the control circuitry for the operation of the motor, including three manually operated controls. The lamp assembly 100 is supported on the under surface of the control box 104. The control circuitry is supported upon a circular printed circuit wiring board, fitted within the control box. The controls for the fixture include a three-way switch S2, operated by a pull chain, for mode selection, a forward-reverse slide switch S1, and a speed adjusting potentiometer R40. The mode selection switch permits four modes: fan on; lamp on; fan and lamp on; and fan and lamp off. The ceiling fixture is energized from a 115 V ac main, connected in series with a wall mounted control 105 which also contains manual controls.

In the example, the wall control includes manual controls for both fan and motor. These also include an on and off switch for the fixture, a motor speed, forward/reverse control, and a lamp dimmer.

Figure 2:
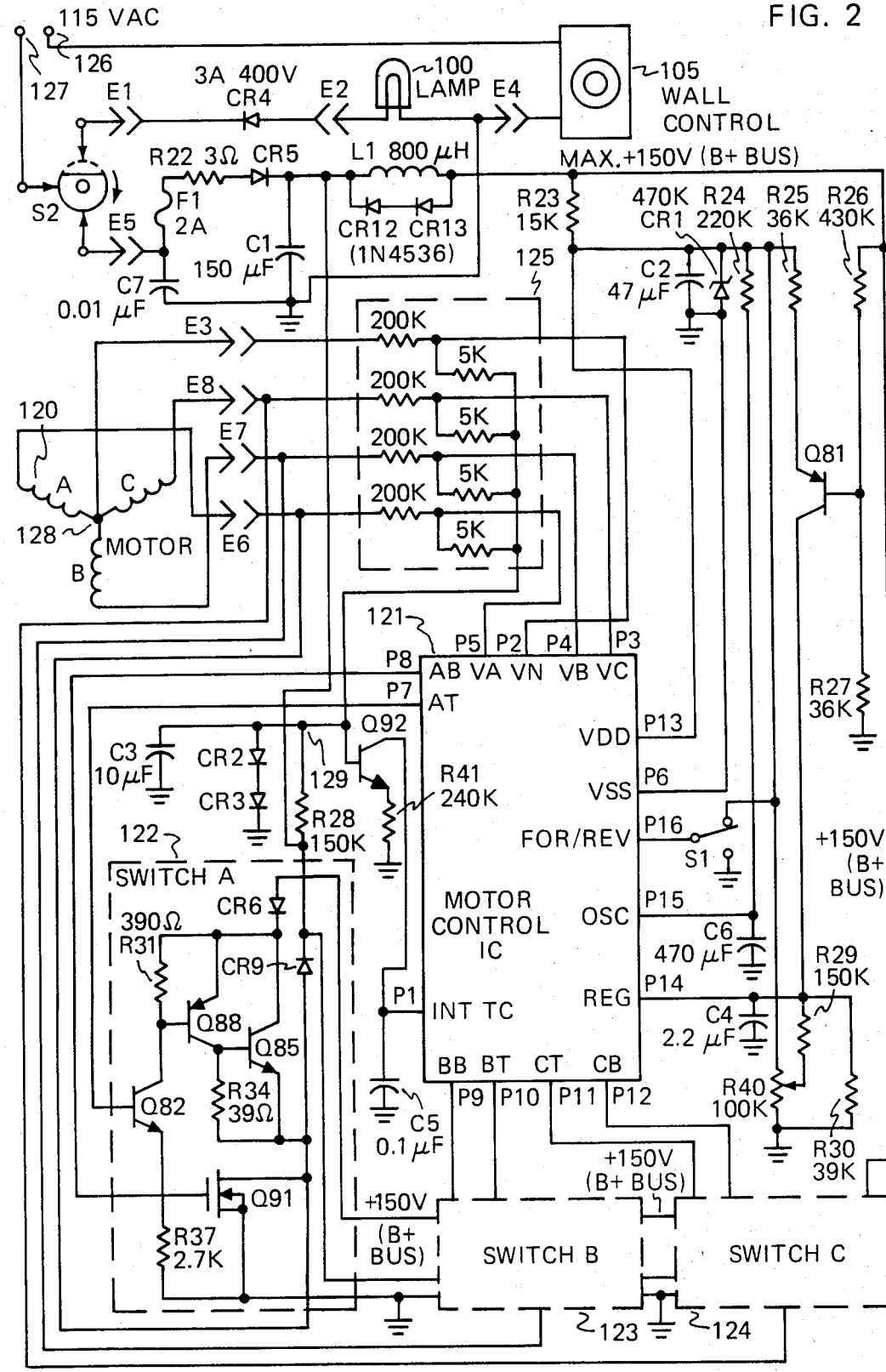
FIG. 2 is a wiring diagram of the electronic circuitry providing electronic commutation of the fan motor and giving effect to the manual controls. More specifically.

The control circuitry for operation of the ceiling fixture is illustrated in FIG. 2, which is a wiring diagram of the FIG. 1 installation. FIG. 2 contains as its principal features, the lamp 100, the three winding stage motor 120, the wall control 105, the wiring mounted on the printed circuit board, which includes as five major features, a motor control integrated circuit 121, three principal solid state switches 122, 123, 124 and a four section, precision resistance voltage divider 125. In addition to these five principal features, the printed circuit board includes the circuit elements for supplying power to the lamp, the motor, the motor control IC, and the timing and the manual controls coupled to the integrated circuit.

Operation of the fixture takes place in the following manner. The lamp receives power during "positive" half cycles of the ac main. Lamp (only) operation takes place when the three-way mode selection switch S2 is rotated to the lamp only position. Let it be further assumed that the wall control is "on" providing a low resistance bidirectional current path between its two external terminals. Assuming that the 115 V ac main is energized, ac current follows a path from the first ac terminal 126, via the wall control 105, the demountable connector E4, the lamp 100, the demountable connector E2, the anode first and the cathode second of diode CR4, the demountable connector E1, the switch S2, and finally the second ac terminal 127.

The motor and the IC receive power during "negative" half cycles of the ac main. Assuming that switch S2 is rotated to the motor only, or motor and fan on position, current from terminal 127 progresses via the switch S2, the connector E5, to a 150 V dc power supply, consisting of a fuse F1, a current limiting resistance R22, a diode CR5, and a filter capacitor C1 connected between the cathode of the diode CR5, and the common ground connection of the supply. The transistor switches 122, 123, 124 each have a power input terminal connected via a protective network (L1, CR12, CR13) to the 150+ volt bus of the dc supply originating at the cathode of diode CR5, and a load terminal connected respectively via the connectors E6, E7 and E8 to one end of the motor winding stages A, B and C respectively. The other ends of the motor winding stages are connected to a neutral node 128, which is not an external connection point for motor energization. The switches A, B and C, which are identical, operate with one switch (for instance A) conductive high, another (for instance B) conductive low, and the third switch (C) in a high impedance (non-conductive) state. In this instance, current flows from the 150 V B+ bus via switch 122, connector E6 into the winding A, via the winding node 128 into winding B, into the connector E7, via switch 123 to the common ground. The common ground, also the negative terminal of filter capacitor C1 is returned via connector E4, and the wall control 105 to the other terminal 126 of the ac main. As has been indicated, power is supplied to the motor 120 and the motor control IC 121 only during the negative half cycle of the ac main because of unidirectional conduction by the diode CR5. Power is supplied to the lamp only during the positive half cycles of the ac main because of the unidirectional conduction of the diode CR4.

The motor control IC 121 receives its power (Vdd) at the output of the protective network (L1, CR12, CR13) via a voltage dropping resistor R23, a filter capacitor C2, and a voltage limiting zener diode CR1, which is coupled to the pad P13. The IC ground (Vss) is returned via the pad P6 to the system ground, to which the capacitor C2, and the zener CR1 are also returned. The arrangement provides an approximately +9.0 volts Vdd potential for operating the IC. The IC is manufactured of silicon using a complementary (C) metal oxide semiconductor (MOS) process. The CMOS process readily produces P-channel field effect transistors (FETs), N-channel field effect transistors, single diodes, and resistances.

The control IC provides the appropriate output signals to commutate the three winding stage motor 120, and effectuates control over the motor giving effect to the manual controls in the motor mounted control box 104 and in the wall control 105. The IC derives the timing information used for commutation from the individual winding stages of the motor, the non-energized winding being sensed for back emf, to define the instant for commutation. The ends of the winding stages A, B and C, including the winding node 128, are connected respectively via the connectors E6, E7, E8 and E3, to one end terminal of each of four separate, precision, two resistor voltage dividers. The other end terminal of each divider is interconnected at node 129 and returned via two series connected, forward sensed diodes CR2 and CR3 to ground. The diodes are shunted by a filter capacitor C3. A resistance R28 connects the node 129 to the B+ output at CR5, C1. The taps on the four voltage dividers, which are set at a division ratio of 1 to 41, are coupled respectively to the input pads of the motor control IC labeled P5 (VA); P4 (VB); P3 (VC); and P2 (VN). The voltage division ratio is designed so that the voltage swing about neutral (VN) at the IC inputs does not exceed the input capabilities of the motor control IC. The foregoing configuration, which is used for sensing the back emf in the momentarily non-energized winding stage, allows the voltage on the neutral winding node 128, which ideally equals half the apparent B+ supply, and which is also divided down to 1 part of 41 to form a reference voltage (VN). The voltages VA, VB or VC referenced to the voltage (VN) form a suitable signal for application to the differential input of the IC.

For assured starting in the face of error in the Single In-line Plastic (SIP) resistance matrix 125, a discharge mechanism (Q92, R41) at P1 for capacitor C5 is provided, which still maintains an essential minimum time constant of 0.20 sec. The collector of Q92 is connected to P1, the emitter via R41 (240 K) to system ground, and the base to node 129 so as to provide a 2½μa current drain at P1. The selection provides a starting period of 0.25 seconds and a margin for a 2μa system error. The offset error in timing becomes negligible at medium and high rpms.

The switches 122, 123 and 124 are designed to respond to control signals supplied by the IC at the pads P7 (AT); P8 (AB); P9 (BB); P10 (BT); P11 (CT); and P12 (CB). The initial letters, A, B and C designate the winding stage of the motor 120. The second letter "T" denotes that "on" signals from the pads so designated on the IC will produce switch conduction to the +150 volt bus (T for Top) in relation to system ground potential or to a point +75 volts in relation to the voltage on the neutral winding node 128. The second letter "B" denotes that "on" signals from the pads so designated on the IC will produce switch conduction to system ground (B for Bottom) or to a point −75 volts in relation to the voltage on the neutral node.

The circuit of the switch 122, which controls the A winding of the motor, is shown in FIG. 2. It comprises three bipolar transistors Q82, Q88, Q85, which function to couple the non-neutral terminal of winding A terminal to B+ when AT at P7 is high and a single FET Q91, which functions to couple that winding terminal to system ground when AB at P8 is high. The switches represent a low cost design, with the base of the input NPN transistor Q82 being coupled to the pad P7, and the emitter connected via R37 to ground. The signal appearing at the collector of Q82 is developed in the load resistor R31, serially coupled via the protective diode CR6 cathode first, anode second to the 150 V B+ bus. A PNP transistor Q88, connected in the emitter common configuration, has its base connected to the collector of Q82, its emitter coupled to the cathode of diode CR6. The collector of Q88 is connected to the base of the NPN output transistor Q85, and via a collector load resistance R34 to the emitter of Q85. The collector of Q85 is connected via diode CR6 to the +150 volt bus. The emitter of Q85 is coupled via connector E6 to the A winding stage. Transistor Q88 serves to shift the level and provide the correct sense for driving the output transistor Q85. The diode CR9, which has its anode coupled to the emitter of Q85, and its cathode coupled to the B+ output at CR5, C1, is a flyback diode, reducing the inverse switching transients. The Q82, Q88, Q85 combination provides a low resistance, high current capacity connection of winding stage A to the +150 V bus when the voltage AT at pad P7 goes to an active high.

The field effect transistor Q91 is an N-channel device, which couples winding stage A to system ground. The gate of Q91 is coupled to pad P8, the source is connected to system ground, and the drain is connected to the emitter of Q85, and via connector E6 to the non-neutral terminal of winding stage A. Transistor Q91 provides a low resistance, high current capacity connection of winding stage A to the system ground when the voltage AB at pad P8 goes to an "active" high. The high currents under discussion are those appropriate for a 50 watt fan motor.

The inductor L1, as a part of the protective network (L1, CR12, CR13), prevents the extremely high switching current peaks which would stress the solid state power switches. In this application, the problem is more acute in the bottom rank FETs (Q91 in switch A, or the counterparts of Q91 in switches B and C). These peak currents would ordinarily occur when selected upper rank bipolar transistor switches (Q85 in switch A, or the counterparts of Q85 in switches B and C) are turned on, while the current from the motor is flowing in the diode portion of the FET (drain-source connection). The recovery of this "diode" (structurally the base-collector junction of a bipolar transistor inherent in the FET) determines this current and the "safe" recovery of the device.

The two serially connected diodes CR12 and CR13 shunt L1, so that the voltage transients appearing on the 150 V bus will be clamped to the main filter capacitor C1. Therefore, the B+ connection to these switches will not fly back significantly above the B+ voltage established by the filter capacitor. For the circuit to be effective, one of the diodes (e.g. CR12) should be a fast recovery diode. The protective circuit protects against the "shoot thru" current mentioned above, during PWM switching, which could otherwise result in dangerously high peak currents in both ranks of the transistor switches.

An alternative protective scheme for the lower rank FETs is to use two diodes, one connected between the drain and the system ground in shunt with the lower rank FET (e.g. Q91), the diode being poled to conduct when the FET is back-biased, and a second diode inserted in the drain poled to conduct when the FET is forward biased.

As the drawing of the switch implies, if both pads P8 and P7 are low, the switch A is in a high impedance state, or non-conductive state, with the non-neutral lead at the winding stage A, now unenergized, free to reach whatever value is produced by the back emf as the winding stage A is subjected to the field produced by the rotating permanent magnet rotor.

The sequence in which switching occurs is shown in the commutation waveforms of FIG. 3. The waveforms available at the pads P7–P12 on the IC for control of the switches 122, 123, 124 are the six lowermost waveforms (AT, AB, BT, etc.), with those to the left representing FORWARD motor rotation and those to the right representing REVERSE motor rotation. The two waveforms denoted the "FOR" for forward or "REV" for reverse waveforms are internally generated on the IC, and are affected by the setting of SPDT S1, connected to the FOR/REV pad P16, and the wall control. With the IC in a Forward state, (FOR active high), the switching waveforms allow a first sequence from the left margin to the center of the drawing. Should the forward signal go low and the reverse signal go high, the switching signals will resume a second sequence.

The Commutation Output Waveforms or energized winding selection signals, occur in a sequence of 6 waveforms (AT, AB, BT, BB, CT, CB) for energization of the winding stages A, B or C. The "highs" of each waveform (for purposes of initial discussion, the vertical markings under highs on the waveform, which denote duty cycled operation, are ignored.) have a duration of two counts of the least significant bit (B0) of a three-bit (B0, B1, B2) Modulo 6 Counter. The motor, taken as a whole, has 6 distinctive energization states, in each of which one winding (A, B or C, e.g. A) is connected to B+, one remaining winding (B or C, e.g. B) is connected to ground, and the remaining winding (e.g. C) is not energized. Each motor energization state lasts for one count of the least significant bit (B0) of the Modulo 6 Counter, and each motor energization state ends—by definition—at the commutation instant.

The commutation output waveforms, as will be described, are logically derived from the counts (B0, B1, B2) of three flip-flops in the Modulo 6 Counter which lead to six counter output states $\overline{CS0}$, $\overline{CS1}$, $\overline{CS2}$, $\overline{CS3}$, $\overline{CS4}$, $\overline{CS5}$, (the overlining denoting that the low is active). The counter output waveforms ($\overline{CS0}$, etc.) are used to derive the commutation output waveforms and are unenergized winding selection signals used for selecting the unenergized winding at the input of the control IC for commutation sensing.

The order of active lows of the CS0–CS5 waveforms to the left of the margin ascend to the right (from $\overline{CS0}$ to $\overline{CS5}$ before reversal, and descend to the right ($\overline{CS5}$ to $\overline{CS0}$) after reversal. The BB and CT waveforms are undefined until the $\overline{POR}$ (power on reset) goes to an inactive high, releasing the counter from the $\overline{CS0}$ state (B0=0; B1=0; B2=0). At the next count, $\overline{CS0}$ goes high and $\overline{CS1}$ goes low, AB goes on, BB and BT are off, and CT continues on. At the next count, CS2 goes low, AB stays on, BT goes on and CT and CB are off. The described sequence of winding energizations continue to the center of the figure until FOR goes low, at which the sequence reverses as illustrated.

The production of the correct sequence of switching waveforms to produce forward rotation, reverse rotation, or faster or slower motor rotation, and to commutate the stator assembly at the correct angular position of the rotor is the function of the motor control IC 121, whose internal design will now be described.

MOTOR CONTROL IC 121 FOR ELECTRONICALLY COMMUTATED DC MOTOR

Figure 4:
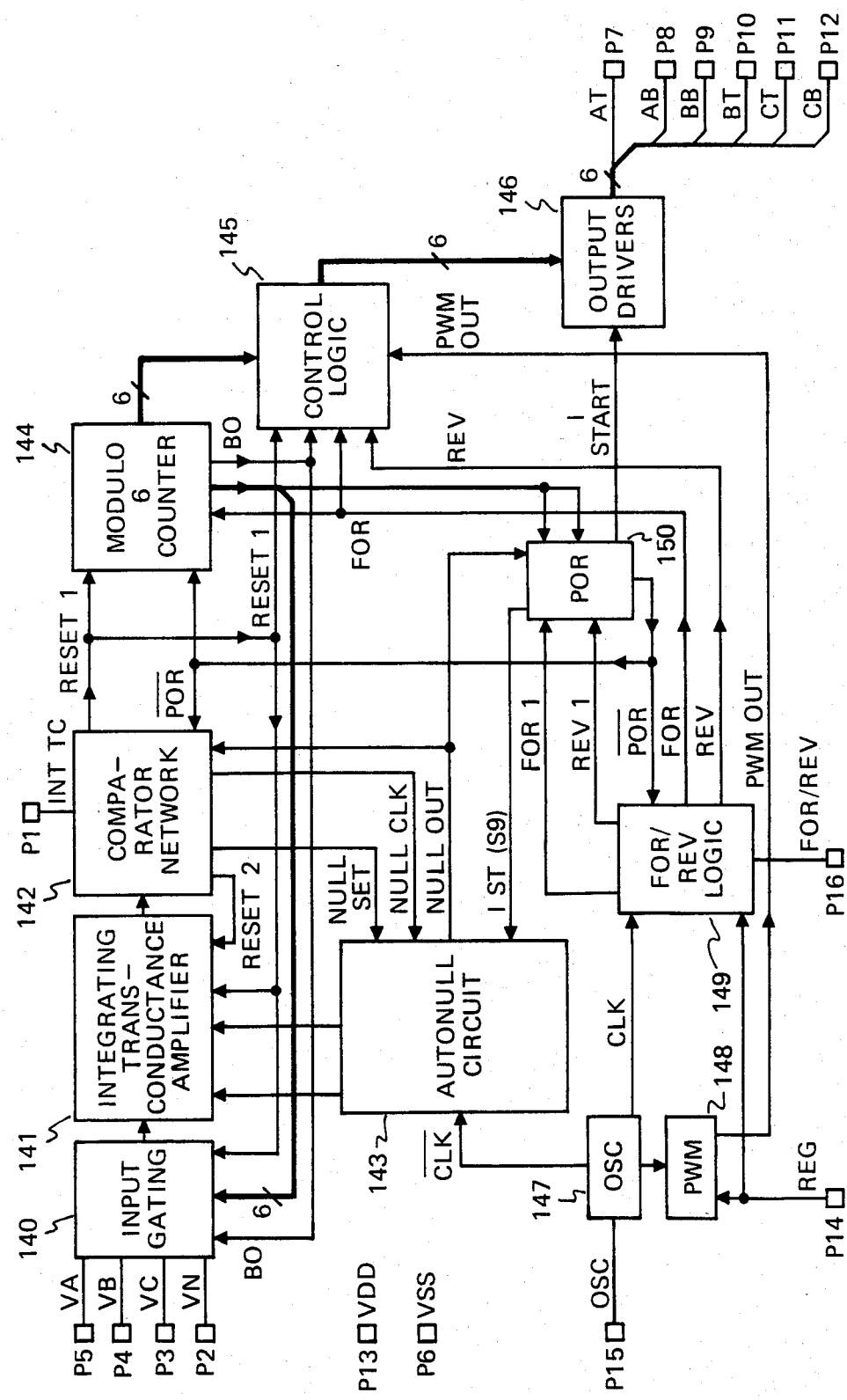
FIG. 4 is a block diagram of the principal functional subdivisions or blocks of the motor control integrated circuit and the functional interconnections between said functional blocks.
Figure 5A:
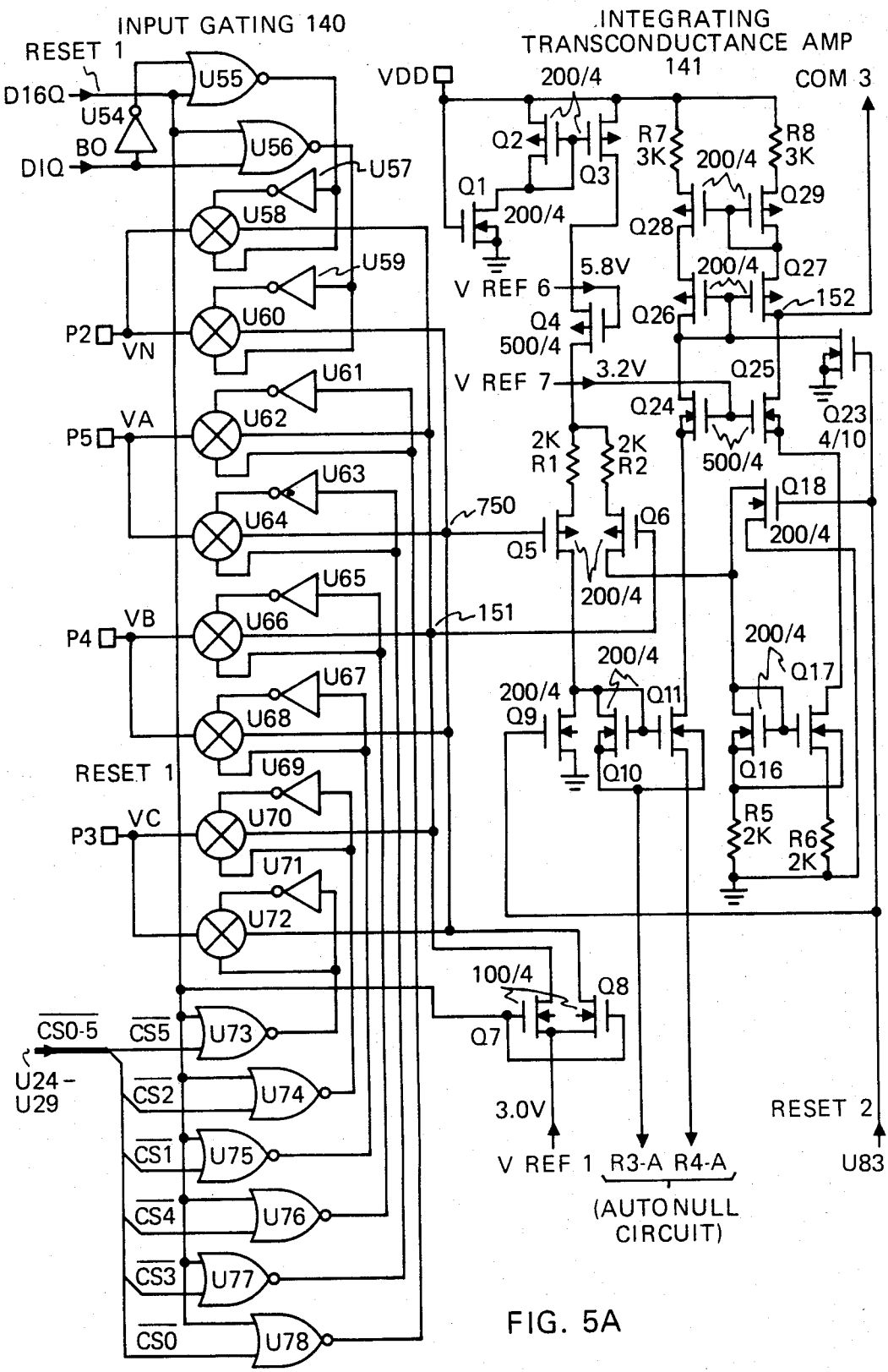
Figure 5B:
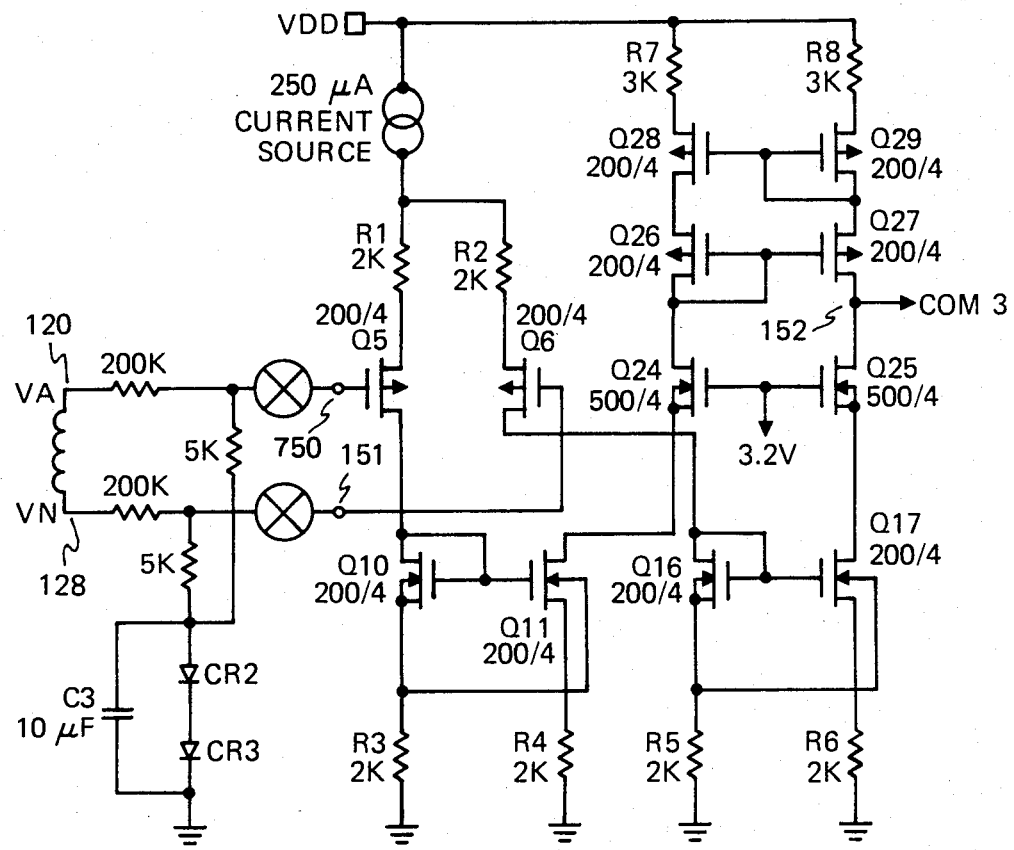
FIGS. 5B, 5C and 5D are simplified electrical circuit descriptions of the Integrating Transconductance Amplifier.
Figure 5C:
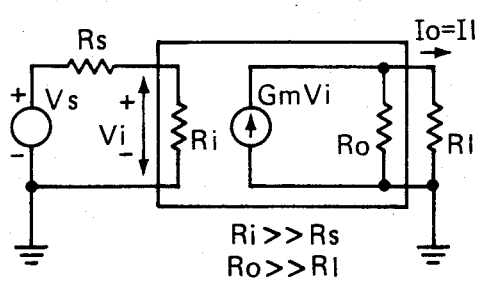
Figure 5D:
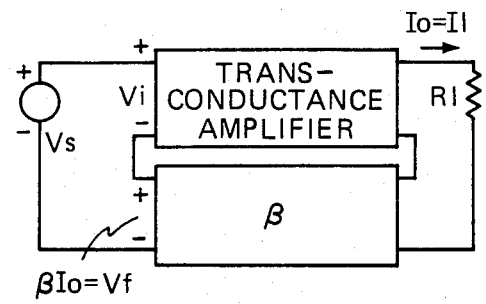
Figure 6:
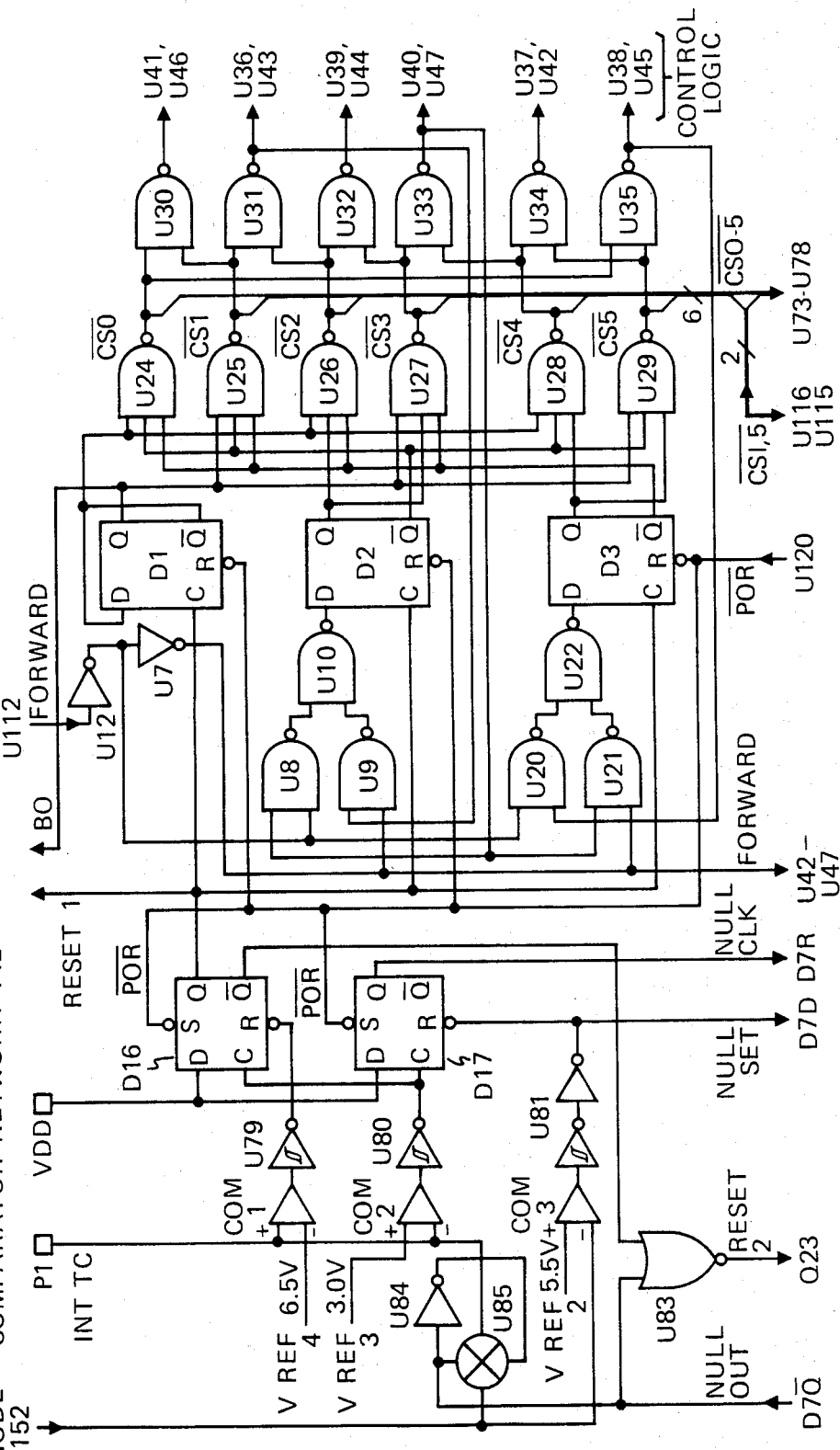
Figure 7:
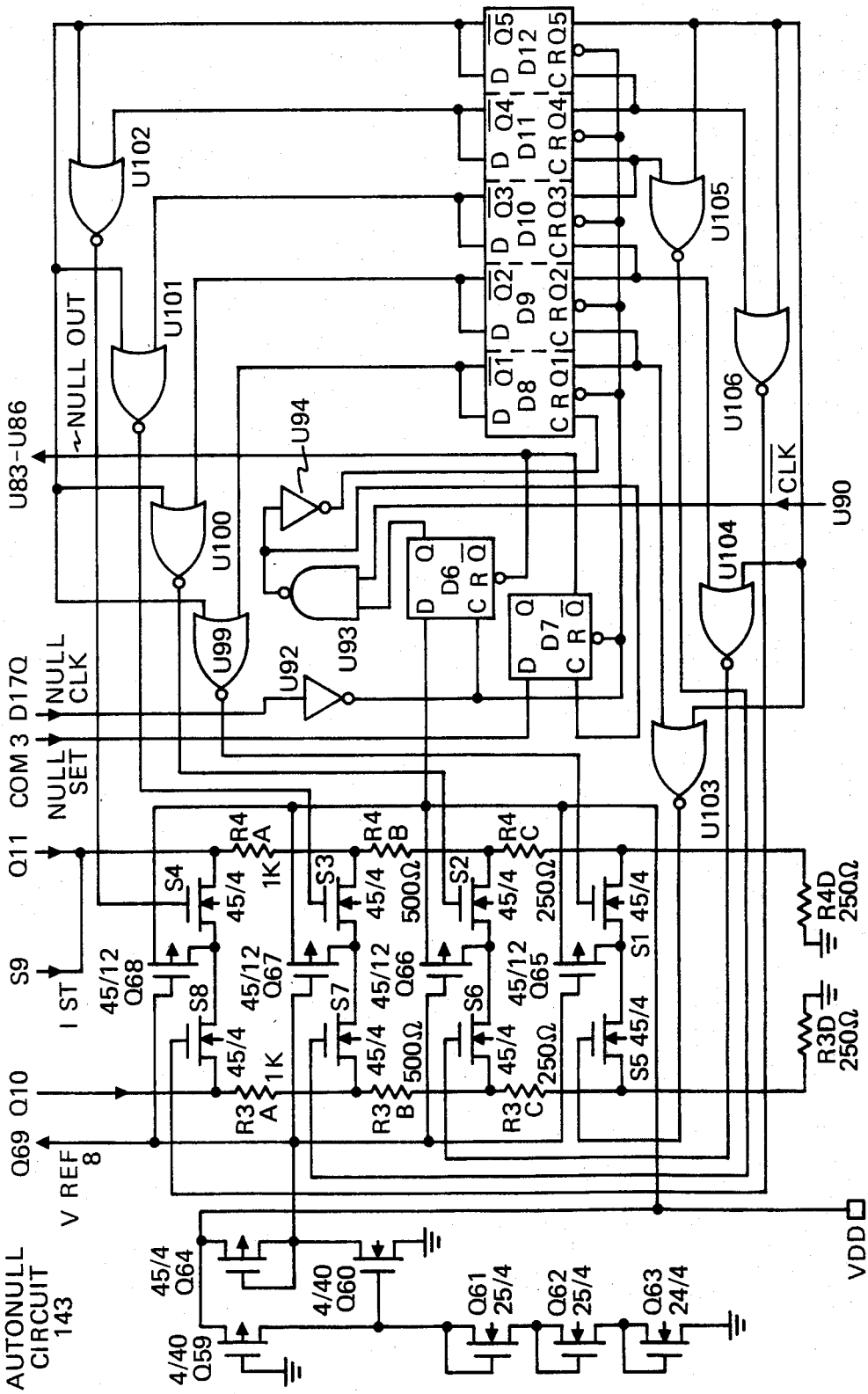

The principal functional subdivisions of the motor control IC 121 are shown in FIG. 4. The detailed logical and/or circuit designs of the functional blocks are shown in FIGS. 5A, 6, 7, 9, 10A and 11A.

The control IC consists of 11 interconnected blocks 140 to 150 interconnected to the circuitry on the printed circuit board by the 16 pads P1 to P16 as already noted. The rotational position of the rotor is "identified" by the Modulo 6 or Commutation Counter 144, which has six states ($\overline{CS0}$–$\overline{CS5}$). The permanent magnet rotor, due to magnetic coupling rotates in synchronism with the rotation of the magnetic field produced by the stator assembly. Depending on the number of "poles" of the motor, the count may repeat once, twice, three times, four times, etc. per revolution. The actual embodiment herein described employs a 6 pole permanent magnet rotor with an 18 coil, 3 winding stage, 36 "tooth" stator assembly. The 6 count is repeated three times per revolution.

The Modulo 6 Counter 144 controls the sequential switching of the Output Drivers 146 for sequential energization of the winding stages, and for the sequential enabling of the Input Gate 140 for selecting the appropriate unenergized winding for commutation timing. The Counter is subject to control for a foward or a reverse count by means of the Forward waveform (FOR) derived from the Forward/Reverse Logic 149. When power is first applied, the Counter is held in a preset state by means of the Power On Reset waveform ($\overline{POR}$) derived from the Power On Reset Waveform 150. The commutation instant for the electronically commutated motor is defined by means of the positive going edge Reset 1 waveform supplied by the Comparator Network 142 to the counter 144. The Reset 1 waveform "clocks" the Counter 144, thus defining the instant that the energization stage of the rotor changes and the instant that the winding stage being sensed for commutation timing is changed. The Modulo 6 Counter 144 controls the energization sequence of the winding stages A, B and C by means of the control Logic 145, the Output Drivers 146, and the switches 122, 123 and 124. The output from the Counter 144 in the form of six NANDed combinations of m adjacent counter states ($\overline{CS0}$, $\overline{CS1}$; $\overline{CS1}$, $\overline{CS2}$; etc.) and the least significant bit (B0) of the counter memory is coupled to the Control Logic 145. The Control Logic 145, decoding the outputs from Counter 144, derives high or low control signals for application to the six individual drivers, which make up the Output Drivers 146.

The Control Logic 145 is subject to control for a forward or a reverse count by means of the FORWARD Waveform (FOR) and the REVERSE Waveform (REV) derived from the FORWARD-/REVERSE Logic 149. It is also subject to a control which inverts the sense of the driver output on alternate counts. This inversion is achieved by means of the B0 waveform derived from the least significant bit of the Counter memory, and NORed with the RESET 1 waveform derived from the Comparator Network 142. The Control Logic, by means of the PWM Output Waveform derived from the Pulse Width Modulator 148, effects a pulse width modulation of a 20 KHz oscillation from Oscillator 147, which affects the conduction duty cycle of the output drivers in the manner indicated in the vertically lined areas of the driver waveforms (AT, AB, etc.) of FIG. 3.

The Output Drivers 146 to which the waveforms (AT, AB, etc.) are applied provide signal gain at the pads P7–P12 of the Motor Control IC adequate to drive the separate switching transistors in the solid state switches 122, 123, 124 on the printed circuit board. The output drivers 146 by means of the I start waveform derived from POR 150, defer the actual application of power to the motor windings until 5 commutation intervals have taken place after power is initially turned on. This allows the commutation timing circuitry to stabilize before the actual application of power to the windings.

The Modulo 6 Counter 144 sequentially enables the Input Gating 140 for selecting the appropriate unenergized winding stage for connection to the Integrating Transconductance Amplifier 141 and Comparator Network 142 for commutation timing. In timing the commutation, the back emf developed in the unenergized winding stage (as a result of rotation of the permanent magnets on the rotor past the stationary, un-energized winding stage) once selected by the Input Gating 140, is amplified in the Amplifier 141, and integrated and measured in the Comparator Network 142 to determine the correct commutation angle. The selection of the appropriate unenergized winding stage by the Input Gating 140 is synchronized with the selection of the other two of the three winding stages by the Control Logic 145 for energization.

The Input Gating 140 is coupled via pads P2–P5 to the voltage divider matrix in the printed circuit board connected to the non-neutral terminals of each of the three motor stator winding stages (A, B, C) and to the neutral terminal for selection of the appropriate timing information. The Modulo 6 Counter controls the Input Gating 140 in indentifying and selecting the stator winding stages which are unenergized, by providing the six counter output waveforms ($\overline{CS0}$, $\overline{CS1}$, etc.) to the enabling inputs of the Gating, which have an active low when the Gating should be enabled. The output of the Input Gating is connected to the input of the Integrating Transconductance Amplifier 141, which has two differentially connected inputs. The Input Gating selects a single identified unenergized winding stage taking one input (e.g. VA) from the non-neutral terminal of the winding stage, and one input (e.g. VN) from the neutral winding node 126. The counter stages ($\overline{CS0}$, $\overline{CS1}$, etc.) are assigned to cause alternation of the sense of the connections between the non-neutral terminals of the winding stages and the Amplifier inputs on successive counts. The alternation of the connection sense between the common neutral terminal and the Amplifier inputs is achieved by means of the least significant bit (B0) derived from the Counter memory.

This alternation by the Input Gating 140 of the sense of the connection between the winding stages and the Integrating Amplifier 141 is necessary to insure that the polarity of the Amplifier output is always the same. The waveform of the back emf appearing on one winding stage has a first slope (e.g. positive) while the waveform of the next winding stage for the next period of integration has an opposite slope. The inversions produced by the Input Gating thus keep the sense of the Amplifier output the same for successive integration periods.

The Input Gating 140 is thus the input switching means of the IC which couples the back EMF waveform via the matrix 125 from the winding stage. This waveform, which indicates the instantaneous angular velocity of the rotor is next coupled to the blocks 141, 142, 143 for integration to obtain the angular translation of the rotor. These blocks, and more particularly the Comparator Network 142 (including C5), produce an output pulse, i.e. the Reset 1 pulse, at the instant the correct rotor angle for commutation has been reached. The Reset 1 pulse is used to clock the Modulo 6 Counter 144. The Reset 1 waveform is also coupled to disable the Input Gating during the nulling of the Amplifier 141 and during resetting of the integrating capacitor (C5), connected to the Comparator Network 142.

The Integrating Transconductance Amplifier 141 is a difference amplifier to the two inputs of which the signal from the selected winding stage in the form of a voltage are differentially applied. The Integrating Transconductance Amplifier 141 converts the differentially applied input voltage to an output current which is integrated in the Comparator Network 142 in determining the correct commutation angle. The output current from the Amplifier is coupled to an integrating capacitor C5 coupled to pad P1. Capacitor C5, in storing the Amplifier output current, develops a voltage derived from the selected unenergized winding stage, which is an appropriate means of determining the instantaneous rotor angle. The voltage integral is a measure of the angular position of the rotor which is substantially independent of the rate of rotation of the rotor over a 10/1 range of rotational rates. The voltage appearing on the capacitor C5 as a result of integrating the Amplifier output current provides an accurate duplication of the voltage integral to the extent that the Amplifier output current is proportional to the differential input voltage and to the extent that a time integral of the Amplifier output current is equal to the time integral of the input voltage. The voltage integrated by the capacitor C5 is then compared with a standard voltage (Vref 3) corresponding to a known optimum rotor commutation angle to determine the instant that commutation should take place.

The accuracy of this method of rotor angle determination depends on the stability of the transconductance of the Integrating Transconductance Amplifier, and, since the Amplifier is a direct coupled difference amplifier susceptible to imbalance, it also depends on the accuracy with which any imbalance may be compensated.

The output of the Amplifier 141 is coupled to a Comparator Network 142, which detects when the voltage stored in the capacitor C5 as a result of current integration has equaled the standard voltage corresponding to the correct angular position of the rotor for commutation. When equality is sensed, the Comparator Network signals (RESET 1), the commutation instant to the Modulo 6 Counter 144. Upon this signal, the Counter advances to the next count, and the Input Gating 140 and Output Drivers 146 are advanced to implement the commutation and commence the energization, deenergization and voltage sensing for the three winding stages appropriate to the next count.

Figure 8:
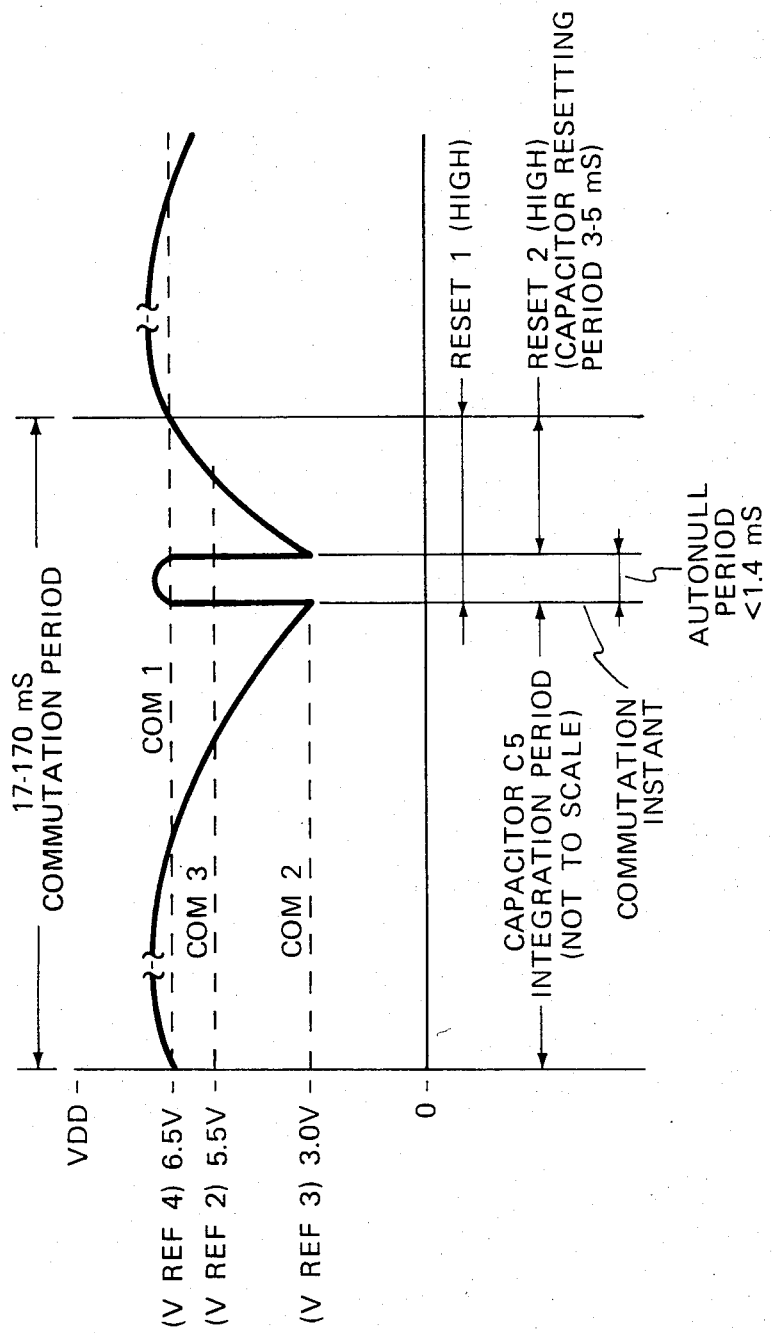
FIG. 8 is the output waveform of the Integrating Transconductance Amplifier for a single commutation period. The waveform illustrates the time allocated between integration and reset of a capacitor used to time the commutation instant and the nulling of the Amplifier.

The third block active in commutation timing is the Autonull Circuit 143, which provides an offset to correct any imbalance in output current of the Integrating Amplifier. "Nulling" of the Integrating Amplifier occurs on each commutation. As illustrated in FIG. 8, nulling takes place after the capacitor integration period has ended, signaled by the RESET 1 pulse, but before the timing capacitor (C5) is reset (during RESET 2) preparatory to the next capacitor integration period. The Amplifier 141 is placed in a condition to be nulled, and then causes reset of the integrating capacitor by the application of the RESET 1 and RESET 2 waveforms, respectively. The RESET 1 waveform shorts the differential input of the Amplifier, and thus provides a zero differential input signal essential to nulling. The Reset 2 waveform is active after nulling, and sets the amplifier output into a state in which the integrating capacitor (C5) is rapidly recharge toward Vdd. In addition, during nulling, certain controls are applied to the resistances R3A–D and R4A–D, which for certain purposes, form a portion of the Amplifier. These will be discussed in connection with the Autonull Circuit.

The nulling of the Amplifier 141 produces a periodically verified current offset which is applied to one amplifier channel to null the amplifier output current for a zero input signal. The Autonull Circuit 143 produces this offset current in small ($\frac{3}{4}$ μA) increments which are applied to a current offset one channel of the amplifier. The increments are designed to raise or lower the current transfer ratio of a mirror in one channel of the Amplifier to bring the output current of that channel into balance with the output current of the other channel. The nulling takes a small time, typically less than a millisecond, but not exceeding a maximum of 1.4 milliseconds. After nulling, the timing capacitor C5 is reset (during RESET 2), which takes 3–5 milliseconds, to prepare for the next capacitor integration period to time the next commutation. It is also necessary to provide this time delay after commutation has taken place to assure that all of the stored energy in the now unenergized winding (which was energized prior to commutation) has time to dissipate. This is necessary to assure that stored energy is not incorrectly interpreted as back-emf causing a large error in the commutation instant. The Autonull Circuit 143 and its relationship to the other functional blocks will be described in detail below.

The remaining blocks in the control IC deal primarily with implementing the manual control functions. When the ceiling fixture is turned on, and power is to be applied to the fan motor, the "Power On Reset" (POR) is active.

The POR 150 is a protection circuit for other portions of the ECM control circuit which becomes active when power is turned on or turned off. It insures that the protected circuitry is held in a desired safe inactive state when the supply voltage on the protected circuit is below a first value when power is turned on, or below a second value (usually slightly lower) when power is turned off. When power is turned on, it releases the protected circuit in a desired initial state. The interaction of the POR with other functional divisions of the Motor Control IC is in part illustrated in the waveforms of FIG. 3 and FIG. 12B.

In consequence of the appearance of the active output of the POR when power is turned on, the Amplifier 141 is disconnected from capacitor C5, and the Comparator Network 142 and the Autonull Circuit 143 are preset. This produces an initial state, akin to the occurrence of a commutation instant in preparation for nulling the amplifier. The POR presets the 3 bit memory of the Commutation Counter 144 in an initial (000) state. It presets the Forward/Reverse Logic to the state set in by the switch S1 on the printed circuit board. The presetting occurs immediately after power has been applied to the POR and lasts until Vdd is high enough (e.g. 7.0 volts) to insure that the analog and logic circuitry is valid.

When the active POR output terminates, the autonull circuit is released for nulling, insuring that the Amplifier is nulled before it is used for integration timing. After this, the POR 150, now acting by means of the IST waveform coupled to the Autonull Circuit, influences starting for five artificial counts of the Commutation Counter 144 by introducing an offset current in the resistance network of the Amplifier 141, which facilitates discharge of the integrating capacitor C5 to the voltage set to mark the commutation instant and nulling. For the same 5 count period, the POR, acting by means of the I start waveform, turns off the "bottom" switches of the output drivers, precluding the coupling of energy to the winding stages of the motor until the Amplifier 141, Comparator Network 142 and the Autonull Circuit 143 have stabilized.

The Forward/Reverse Logic 149 is responsive to the setting of the switch S1 coupled to the pad P16 on the IC. It is also responsive to a controlled diminution in the B+ supply effected by the operation of the wall control to reduce the B+ voltage below the desired threshold. In addition, when power is reapplied, after having been turned off, the POR 150 circuit presets the Forward/Reverse Logic to the state that corresponds to the setting of switch S1. A change in the output from 149 which causes the Forward waveform to go to an active High from a prior Low, and the Reverse waveform to go to an inactive Low from a prior High, or vice versa, produces a reversal in the direction of rotation of the motor. These waveforms, which are illustrated in FIG. 3, are the means by which a reversal in motor rotation is achieved. The Forward waveform is coupled to the Commutation Counter 144 to effect both a forward and a reverse count. The Forward and Reverse waveforms are coupled to the control logic for enabling the Forward gates (U42–U47) or the Reverse gates (U36–U41). The Forward or Reverse waveform is also coupled to the POR for decoding the five count interval for simulated commutation. When the Forward/Reverse Logic is in a Forward state, the POR is enabled to count forward to the $\overline{CS5}$ state, and when the Forward/Reverse Logic is in a Reverse state, the POR is enabled to count "backwards" to the $\overline{CS0}$ state, both of which provide the required delay.

Control of the Forward or Reverse state of the Logic 149 is achieved through operation of the wall control 105. If reversal is desired, the motor speed control is moved in the direction of reducing speed past the point at whch the motor will stall. The effect of so moving this control is to reduce the B+ below a threshold. This in turn is sensed on the regulate pad (p 14) via the action of transistor Q81, thus raising the regulate voltage above the peak sawtooth voltage. This is sensed in the Logic and used to cause a reversal in the state of the Forward/Reverse setting. The sensing is achieved by comparing the B+ using circuitry on the printed circuit board including Q81, R25, R26, R27, R29 and R30, with a Zener stabilized voltage reference, also on the printed circuit board, but divided down on the Motor Control IC 121. The Logic includes a comparator which compares a voltage proportional to the B+ voltage with a voltage proportional to the Zener voltage, and includes a circuit on the IC for introducing hysteresis in the threshold to make the switching action positive.

Finally, the Forward/Reverse Logic is provided with a delay based on the use of a 20 KHz pulse for the Oscillator 147 in the actual changeover from forward to reverse operation. The Clock waveform CLK is coupled to the Forward/Reverse Logic to effect this delay.

The Oscillator 147 and the Pulse Width Modulator 148 enter into the regulation of the speed. The motor is designed to run at a speed established by the amount of electrical power supplied to the motor and the amount of mechanical power required to rotate the fan and drive the air impinging on its blades. When greater power is supplied, the rate of rotation increases, and when lesser power is supplied, the rate of rotation decreases. The speed is thus controlled by the amount of power supplied, and that power is subject to a continuous control. The commutation is designed to be at the correct angle irrespective of the speed of rotation and is not intentionally varied with adjustment of the speed.

The Oscillator 147 and Pulse Width Modulator 148 provide the means for adjusting the power supplied to the motor over a range of substantially all off to all on. In practice, the arrangement permits the motor to operate over a 20 to 1 range of speeds. As earlier explained, the motor is energized by simultaneous energization of two serially connected winding stages. Should only one winding stage be energized as when the I start waveform is applied, the motor receives no electrical energy.

The control of the motor speed is exerted by pulse width modulating one of the two switches which are enabled at each count of the counter. This is best seen from an examination of FIG. 3. The waveforms derived by the output drivers (AT, AB, etc.) and coupled to the output of pads P7-P12 illustrate these properties. Each waveform (AT, AB, etc.) has an active high of two counts duration with the same two highs being on simultaneously for only a single count. In addition to the two highs that are on, one is always shown with the vertical lines indicative of pulse width modulation. Thus, by pulse width modulating one of the two active switches, pulse width modulation occurs at all times. In addition, due to the classic nature of the pulse width modulation, the on time of the pulse width modulated waveform may vary from 0 to 100% which thus provides a full range of power control.

The Oscillator 147 is a relaxation oscillator whose principal circuitry is on the IC but which has an external capacitor C6 and a resistance R24 mounted on the printed circuit board and connected to the IC at pad P15. The internal oscillator waveform is a unidirectional pulse having an approximately 20 KHz repetition rate with an on time of 300 nanoseconds for the narrower portion of the pulse. The CLK output of the oscillator derived from a flip-flop (U94–U91) is coupled to the Forward/Reverse Logic 149, as earlier noted, for effecting a delay when the direction of motor rotation is changed equal to at least one pulse width interval. The inverse of the oscillator waveform $\overline{CLK}$ is coupled to the Autonull Circuit 143 where it controls the incrementing rate in the nulling process.

The output of the Oscillator 147 is modulated by the Pulse Width Modulator 148. The components of the Pulse Width Modulator are in part on the integrated circuit and in part on the printed circuit board being interconnected by means of the pad P14 (REG). The external components are largely shared with the Forward/Reverse Logic. They include the potentiometer R40, the resistances R25, R26, R27, R30, and capacitor C4.

Figure 9:
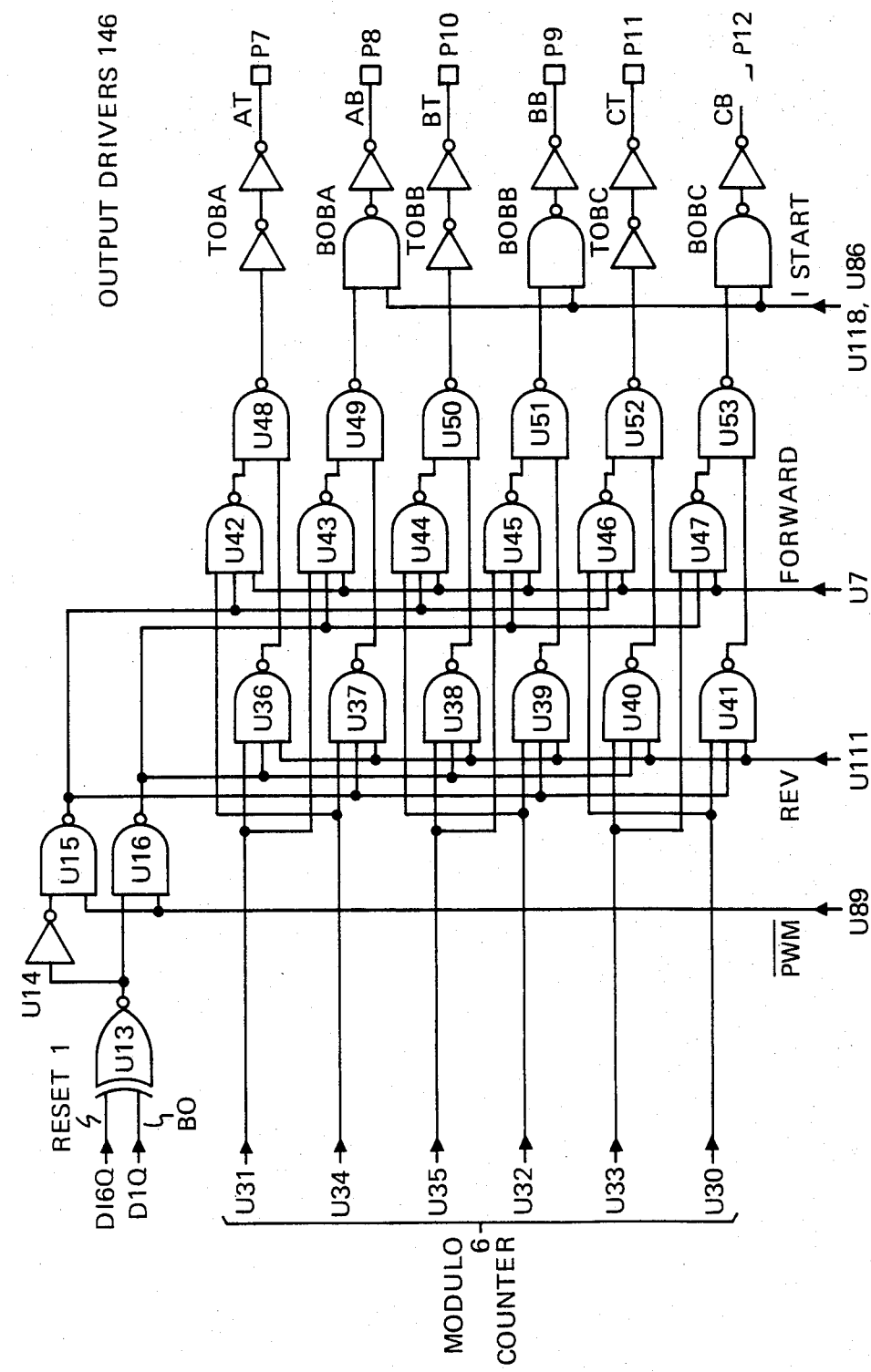
Figure 10A:
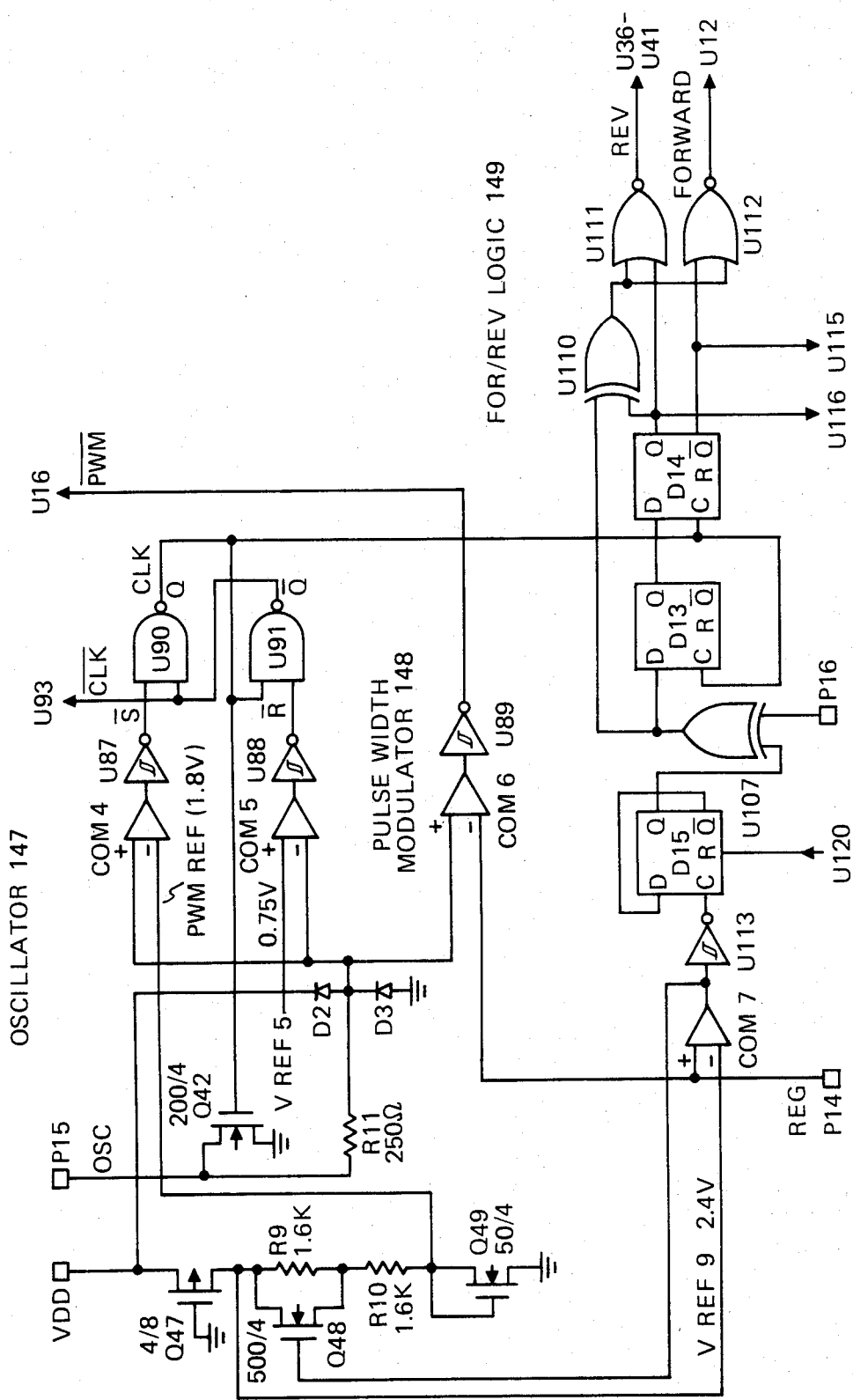
Figure 10B:
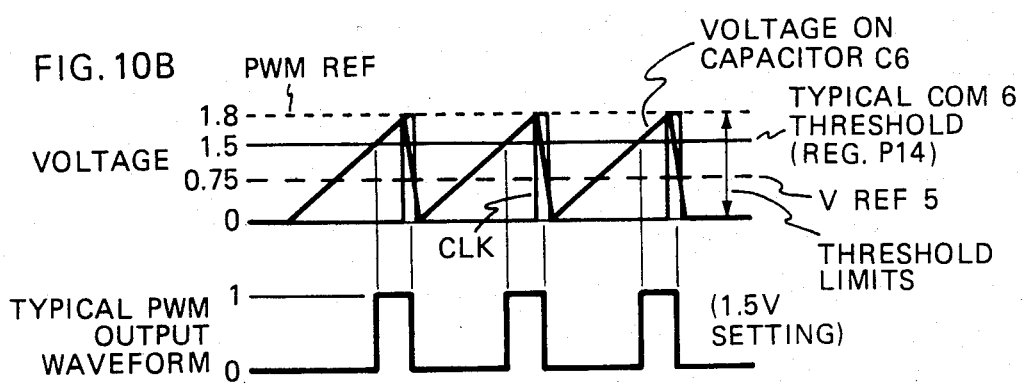
FIG. 10B are waveforms explanatory of operation of the Pulse Width Modulator block.

The Pulse Width Modulator is a classical modulator which provides an output which in the limiting cases is on all of the time or off all of the time, and in intermediate cases is on part of the time and off part of the time, as illustrated in FIG. 10B. The output of the Pulse Width Modulator (PWM out) is coupled to the Control Logic 145 (FIG. 9) by means of which it introduces a pulse width modulation into the switching waveforms in either of the forward bank (U42–U47) or the reverse bank (U36–U41) of gates.

The Autonull Circuit 143 (FIG. 7) nulls the Integrating Transconductance Amplifier to remove any error in timing of the commutation instant attributable to Amplifier input offset and to improve motor starting performance. The Autonull Circuit is located entirely on the Integrated Circuit and requires no pads for external connection.

The Autonull Circuit includes two digitally subdivided resistive elements R3A-D and R4A-D, which are the resistive elements in a current mirror in one of the two channels of the Amplifier 141 following the differential input stage. The current mirror is modified by the inclusion of means for introducing an offset current which may be digitally stepped in $\frac{3}{4}$ µA increments on either the input or output side of the current mirror, and which in effect brings one channel of the Amplifier into balance with the other. The incrementing occurs under the control of a 5 bit counter, which counts at the 20 KHz rate of the Oscillator 147 ($\overline{CLK}$). In the nulling process, the 5 bit counter is preset to a maximum offset current condition and is then decremented at the clock rate until a balance is detected. When the balance is detected, the counter stops and the offset current is maintained until null is again instituted.

Figure 12A:
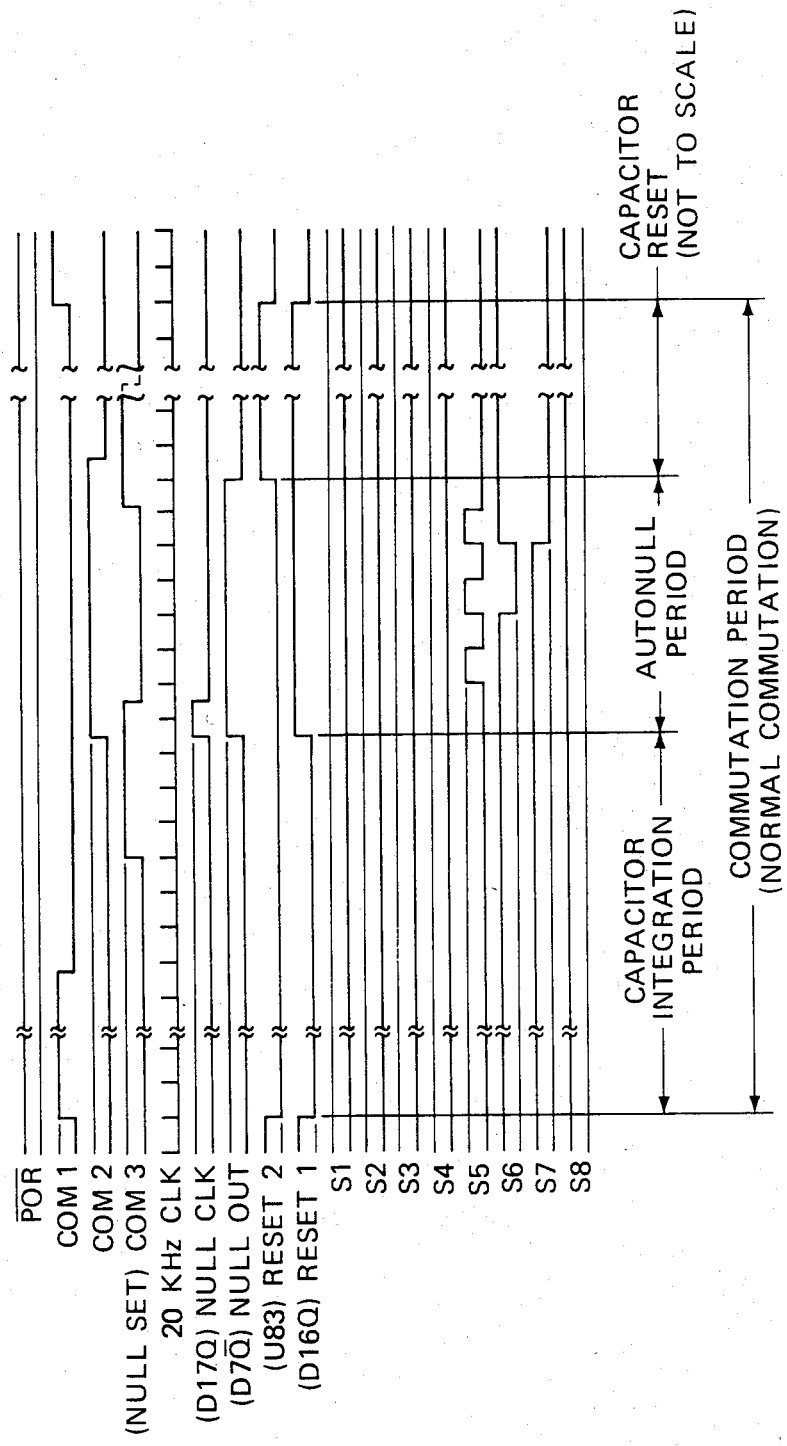
FIGS. 12A and 12B contain the principal internal waveforms incident to operation of the motor control integrating circuit FIG. 12A deals with commutation and balancing of the Integrating Amplifier for an exemplary commutation period.

The Autonulling Circuit functions once for each commutation. The waveforms that are involved in nulling for normal operation are illustrated in FIG. 12A. The nulling period starts after the Comparator Network 142 (COM 2, U80, D16 Q) has signalled the commutation instant (see FIG. 9), causing the RESET 1 waveform to go high (D16 Q). When the RESET 1 waveform goes high, the input to the Integrating Amplifier 140 is referenced to a voltage reference (Vref 1) suitable for nulling and the differential amplifier inputs are shorted together. At the same time the Null Clock waveform is generated by the Comparator Network 142 (D17 Q). This waveform is coupled to a 5 bit counter in the Autonull Circuit (D8, D12) which forces the Autonull Circuit into a PRESET condition in which the maximum offset current, earlier mentioned, is injected into the Amplifier 141. At substantially the same time, the Autonull Circuit generates the Null Output waveform (D7, $\overline{Q}$) which is coupled to a transmission gate U85) at the input to the Comparator Network 142. This disconnects the Amplifier from the external integrating capacitor (C5), leaving the Amplifier output connected only to third comparator (COM 3) in the Comparator Network. The input conditions cause the Amplifier output voltage to climb past the threshold Vref 2 of the third comparator (COM 3) causing the Null Set waveform originating at COM 3 U81 to go low. This waveform when coupled back to the Autonull Circuit, releases the PRESETS on the counter, and allows the counter to decrement at the clock rate. Decrementing is accompanied by a stepped reduction in offset current applied to the Integrating Amplifier. When the comparator COM 3 senses that the voltage at the output of the Amplifier, which had been near Vdd changes in direction, signalling the null, the Null Set waveform goes high. On the following clock pulse the Null Output (D7 $\overline{Q}$) waveform goes low. The Null Output waveform (D7 $\overline{Q}$) is coupled to the Comparator Network which generates the RESET 2 waveform, which converts the Amplifier 141 into a maximum current supply state. At the same time the Null Output waveform operates the transmission gate U85 to reconnect the Integrating Amplifier to the integrating capacitor C5. When the upper voltage reference (Vref 4) is crossed, both RESET 1 and RESET 2 terminate and the next capacitor integration period commences.

Figure 12B:
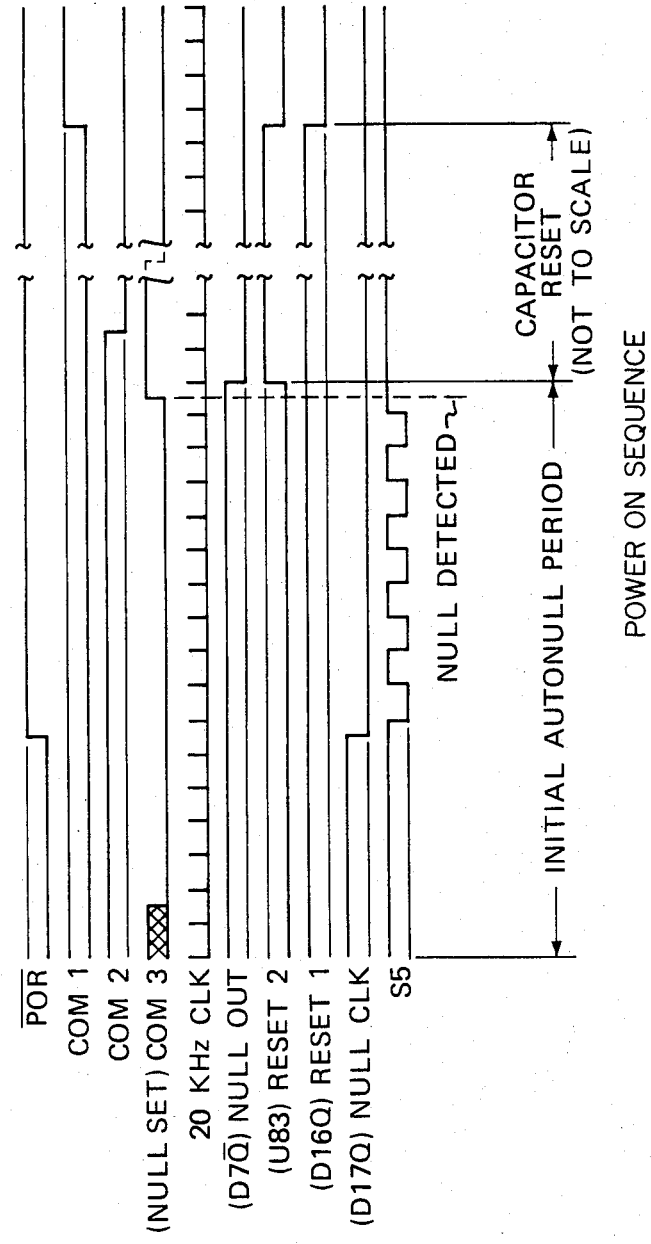

During start conditions the Autonull sequence is affected by the Power On Reset 150. The Power On sequence is illustrated in the waveforms of FIG. 12B. When power is first applied, the $\overline{POR}$ waveform is in an active low which causes the Null Clock waveform (D17 Q) to go high. This causes the Autonull counter to be preset in a high offset current condition. When the $\overline{POR}$ waveform goes to an inactive high subsequently, the Null Clock waveform falls, allowing the counter in the Autonull Circuit to decrement. The autonulling is further affected by the application of an offset current IST which is interrupted during nulling, but active during capacitor resetting and integration. The offset current IST adds to the discharge current of the Integrating Amplifier and causes the integrating capacitor to discharge more rapidly and more positively toward the threshold of comparator COM 2. Under the influence of the logic contained in the POR block, the IST current continues until 5 autonull sequences are completed. During the same 5 count sequence, the lower drivers BOBA-C are also disabled so that no power is applied to the motor windings. On the sixth count, the IST and I Start highs are terminated, the motor windings are energized and autonulling continues in the normal manner.

FUNCTIONAL BLOCKS 140-143

For additional details in the design and operation of the Input Gating 140, the Integrating Transconductance Amplifier 141, Comparator Network 142, and Autonull Circuit 143 all identified in FIG. 4 of the present application, the copending application Ser. No. 502,601 of Messrs. Bitting, Peil, Brown and Guzek filed simultaneously herewith and assigned to the Assignee of the present application is incorporated herewith by reference.

MODULO 6 COUNTER 144

The Modulo 6 Counter is a reversible counter, which maintains a count of the rotor commutation events and position so that the winding sensing sequence and the winding energization sequence keep in step. The Modulo 6 Counter, consistently with a 6 state succession of energization states, repetitively counts to 6, and each counter state corresponds to one of the 6 energization states illustrated in FIG. 3. As earlier noted, the forward sequence and reverse sequence are both illustrated. The event which steps the counter is the production of the Reset 1 pulse from D16, Q at the commutation instant. One output of the counter (the unenergized winding selection signals), in the form of one unique state at one of 6 sequential positions, is coupled via a 6 conductor connection to the enabling gates U73-U78 of the input gating 140. Another output of the counter deals with two state combinations, suitable when applied to the control logic 145 for forming the energized winding selection signals, for jointly energizing two windings in the stepping sequence illustrated in FIG. 3. A third output of the counter is the "Least Significant Bit" (B0; D1Q) used to invert the sense of the neutral winding connection to the input gating (U55, U56) in synchronism with the gating waveforms applied to U73-U78. The controls applied to the modulo 6 counter include a Forward waveform from Forward/Reverse Logic 149 (U112), and a Power on Reset waveform ($\overline{POR}$; U120).

The Modulo 6 Counter 144 consists of the following logical elements: three flip-flops D1, D2, D3 forming the memory of the counter; three two input NAND gates U8, U9, U10, associated with D2 for decoding from the counter output stages the correct next state for D2 in either a forward or reverse counting sequence; three two input NAND gates U20, U21, U22 associated with D3 for decoding from the counter output stages the correct next state for D3 in either a forward or a reverse counting sequence; a first rank of three input NAND gates U24-U29, for decoding the memory states of D1-D3 to obtain a unique state (low) which follows the counting sequence; and a second decoder rank of two input NAND gates for detecting 2 state combinations for application to the control logic 145. Finally, a pair of inverters U12, U7 is provided for introduction of the Forward waveform to the Counter.

The elements of the Modulo 6 Counter 144 are connected as follows. The R inputs of the D1-D3 flip-flops are connected for power on reset to POR 150 (U120 $\overline{POR}$). In starting, $\overline{POR}$ is low, holding D1, D2, D3 in a Q low $\overline{Q}$ high state. When $\overline{POR}$ goes high, the count may proceed. the D16, Q output (Reset 1) is connected to the clock (C) inputs of D1, D2 and D3. The $\overline{Q}$ output of D1 is connected to the D input of D1. The Q output of D1 is coupled to one input of NAND gates U25, U27 and U29. The $\overline{Q}$ output of D1 is coupled to one input of U24, U26 and U28. The Q output of D2 is coupled to one input of U26 and U27. The $\overline{Q}$ output of D2 is connected to one input of U24, U25, U28 and U29. The Q output of D3 is connected to one input of U28 and U29. The $\overline{Q}$ output of D3 is connected to one input of U24, U25, U26 and U27.

The three input NAND gates U24-U29 in the first rank of memory decoders are arranged by the foregoing connections to provide a consecutive repeating succession of unique low states of U24, U25, U26, U27, U28, U29, U24, U25, U26, etc. as the memory of D1, D2, D3 is incremented. At the initial state of the memory, U24 is low. The zero binary state (000) may be verified by noting that U24 has its three inputs connected to D1, $\overline{Q}$; D2, $\overline{Q}$ and D3, $\overline{Q}$. When the inputs are high, the U24 output is low (and all other NAND gates are high). This is the "$\overline{CS0}$" state. Assuming that one count has occurred, and D1, Q is now high, U25 which has its three inputs connected to D1, Q; D2 $\overline{Q}$; and D3 $\overline{Q}$ (all high), the U25 output is low and the other NAND gates are high. This may be called the binary state 001 or the "$\overline{CS}$ 1" state. That this decoding continues may be verified as to each successive counter state. At the next binary state (010 or the "$\overline{CS\,2}$" state): U26 connected to D1, $\overline{Q}$ (high); D2, Q (high); and D3, $\overline{Q}$ (high) goes (low). At the next binary state (011, U27 goes low, etc. The low state remains unique in the NAND gate U24–U29 outputs, which are connected respectively via NOR gates U73–U78 to the inputs of transmission gates U62, U64, U66, U68, U70, U72, respectively, so that only one of the above transmission gates is enabled at one time, and it is enabled in the desired consecutive repeating succession.

The two input NAND gates U30–U35 in the second rank of memory decoders aid in transferring the state of D1 to D2 to D3 in forward and reverse counting and in commutating the sequence in either a forward or a reverse count. This first requires "ORing" two successive states in the first rank of NAND gates for coupling to the second rank. The second rank is also used to further the decoding required for the Control Logic and Output Drivers. In particular, U30 NANDing the outputs of the U24 and U25, is high on the first two states and goes low on the third state when U24 and U25 are both high, and it remains low until the end of the count. U31 NANDing the outputs of U25, U26 ($\overline{CS1}$, $\overline{CS2}$) (equivalent to ORing the active high states CS1, CS2), is low on the first state, high on the next two and low on the last three states. NAND gate U32 NANDs the outputs of U26, U27; NAND gate U33 NANDs the outputs of U27, U28; NAND gate U34 NANDs the outputs of U28, U29; and NAND gate U35 NANDs the outputs of U29, U24.

Only the Forward waveform is applied to the Modulo 6 Counter, and both low and highs of that waveform are used to control the Counter for a forward or reverse count. The Forward waveform from U112 is applied to U12, U7. It is inverted in U12, and re-inverted in U7. The U8, U9, U10 gate assembly associated with counter D2 sets the next state for D2 depending on whether the counter is in a forward or reverse mode. Similarly, the U20, U21 and U22 gate assembly associated with counter D3 sets the next state for D3 depending on whether the counter is in a forward or a reverse mode. The gates U8 and U9 have their outputs coupled to NAND gate U10, whose function is to "OR" the inputs into the D input of D2. Similarly, the gates U20 and U21 have their outputs coupled to NAND gate 22, whose function is to "OR" the inputs into the D input of D3. When the counter is in a forward mode, the gate U9 is driven by U31, which decodes states $\overline{CS1}$, $\overline{CS2}$ if a "low" is present on either state it produces a high at the input of U10, which is coupled via U10 to the D input of D2. At the same time the output from U12, which is in the inverse of the output of U7, is coupled to U8 and to U20. This signal which puts a low on the input of U8 and U20, inhibits the decoded output stage (if low) from being fed back to the D inputs of D2 and D3, respectively.

The transfer of states between flip-flops D1–D3 and formation of the desired consecutive repreating succession is performed in the following manner. In the Forward state, the Forward waveform is high (see FIG. 3), and U12 out is low, U7 is high, making U9 and U21 active in transferring the count D2 and D3. U9 NANDs the output of U7 and the output of U31. U31 is high on the 001 ($\overline{CS1}$ low) and 010 ($\overline{CS2}$ low) states. On the state 001, U9 goes low, and U10, irrespective of the input, goes high, which is coupled to the D input to D2. Upon the next commutation, Reset 1 clocks a high into the Q output of D2 and D1 increments again to 010 ($\overline{CS2}$ low). On the state 010 ($\overline{CS2}$ low), U31 remains high and U9 goes low again, and U10, irrespective of its other input, goes high at the D input to D2. Upon the next commutation, Reset 1 clocks the second high into D2, and D2 Q stays high (011; $\overline{CS3}$ low). Upon the next count, U33 goes high, U21 goes low, and U22 goes high. The next Reset 1 pulse clocks a high into D3, Q out, and a low into the D1 Out for a (100: $\overline{CS4}$ low). The next Reset 1 pulse, U33 remains high and a high is re-clocked into D3; Q low into D2, Q; and a high into D1, Q (101: $\overline{CS5}$ low). In the next Reset 1 pulse lows are clocked into D3 and D2 and D1 changes state to (000: $\overline{CS0}$).

In the reverse state, the Forward waveform is low (see FIG. 3) and U12 is high, U7 is low making U8 and U20 active in transferring the count to D2 and D3. The sequence is now inverted with U29 becoming low first ($\overline{CS5}$ low); U28 low next ($\overline{CS4}$ low), etc. until U24 is low last. Assuming the D1, D2 and D3 are low at the start of the count, U29 which is tied to the Q outputs of D1, D2, D3, goes low on the first count corresponding to $\overline{CS5}$ low state. (The backward count will continue in the same manner already explained.)

The NAND gates U30–U35 also aid in decoding the states $\overline{CS0}$ to $\overline{CS5}$ for application to the Control Logic 145. As noted above, U30, which NANDs the U24, U25 outputs, is in an active high state during $\overline{CS0}$ and $\overline{CS1}$; U31 is in an active high state during $\overline{CS1}$ and $\overline{CS2}$; U32 is in an active high state during $\overline{CS2}$ and $\overline{CS3}$; U33 is in an active high state during $\overline{CS3}$ and $\overline{CS4}$; U34 is in an active high state during $\overline{CS4}$ and $\overline{CS5}$; and U35 is in an active high state during $\overline{CS5}$ and $\overline{CS0}$. In short, by a 6 count 6 overlapping timing waveforms have been created, ordered in correspondence to the high durations of CT; AB; BT; CB; AT and BB (shown in FIG. 3), respectively. These timing waveforms can be coupled to the Control Logic 145 for timing the output signals coupled to the Output Drivers 146.

The Modulo-6 commutation counter (144) is virtually two counters in one, an up counter and a down counter sharing both the flip-flops D1, D2, D3 and parts of the decoding logic (U10, U22, and U29–U35).

The up or down counter is enabled/disabled by the Forward control signal. When the forward gates U9, U21 are enabled, they decode the outputs of the counter flip-flops D1, D2, D3 and set the inputs of these flip-flops to the values required for the next state. At the rising edge of the RESET 1 signal, these inputs are transferred to the output side of the positive edge triggered flip-flops (D1, D2, D3). Since this transition occurs simultaneously with the edge of the incoming RESET 1 signal, each flip-flop is clocked at exactly the same time. This prevents the outputs from changing at different times (i.e., not in synchronization) and causing voltage spikes (glitches) to appear at the counter outputs.

When the outputs of the flip-flops change state at the rising edge of the RESET 1 pulse, they are decoded into a variety of state signals (CS0, CS1 . . . CS5) by gates U24 to U29. Combinations of these states are also decoded by U30 to U35. This decoding occurs, substantially simultaneously with the rising edge of the RESET 1 signal. Any slight delay due to propagation delays (e.g., <100 nanoseconds) through the gates, is several orders of magnitude less than the time it takes for the next rising edge of RESET 1 to occur (milliseconds). Because of this, these signals (which are fed back to the inputs of D1, D2 and D3 to set the next state) will attain a steady value by the time the next rising edge of RESET 1 occurs. Having this stable input available at the inputs of the flip-flops ensures proper "Glitch-free" operation of the counter.

The decoding of each state and synchronous clocking of the flip-flops causes the length of each state to be fixed, and dependent on the length of the RESET 1 pulse and not on the specific state that the counter is in. This is especially important when, in the forward direction, the count reaches 5 and must then go to 0. This counter treats the 5 to 0 transition as just another state transition rather than causing the counter to be RESET when the counter reaches the end of its count. Simply resetting the counter at the end of the count would result in the unwanted shortening of the last state or "Glitches" when performing the RESET. The state transitions for the forward case are 0 to 1, 1 to 2, 2 to 3, 3 to 4, 4 to 5, 5 to 0 . . . , etc. The necessary outputs for the "next" state are available from the gates U24 to U29 which decode the individual states and combinations of these states which are available from gates U30–U35 and returned via gates U8,U9,U10,U20, U21, U22. The gates U24–U35, serve the dual function of providing the next state to the commutation counter as well as providing an indication of the present state, or combination of states, to other circuits on the chip.

The reverse gates U8 and U20 operate in a similar fashion when enabled by the forward signal. In the reverse mode though, the state transitions are 0 to 5, 5 to 4, 4 to 3, 3 to 2, 2 to 1, 1 to 0 . . . , etc. As mentioned before, the counter can only change state on the rising edge of the RESET 1 signal. This ensures that even if the count direction is changed from forward to reverse by switching the "Forward" signal line, no pertubations (glitches) will occur in the output of the counter. The counter will stay in the present state for its correct amount of time and will then continue counting in the opposite direction upon the next rising edge of the RESET 1 pulse.

All of the flip-flops of the counter are equipped with an asynchronous RESET. This RESET is controlled by the Power On RESET circuit (150). When the $\overline{POR}$ line is low, the counter is held in its 000(zero) start state. When the RESET line $\overline{POR}$ is released (allowed to go high), the counter will start counting on the next rising edge of RESET 1 and transition to the next correct state after 0 (5 for reverse direction, 1 for forward direction).

Since there are three memory elements in the counter D1, D2, D3, there are 8 possible states that could occur (0–7). In the event that the counter would find itself in one of the unused states (6 or 7) the counter is designed so that it will transition to a correct state (into the regular counter loop) should one of these states occur. Also the decoder logic U24–U29 has been designed not to decode these two states should they occur. This is so their occurrence does not cause problems to any other logic connected to this circuit.

THE CONTROL LOGIC 145

The Control Logic 145 accepts the timing information from the Modulo 6 Counter at the outputs of gates U30 to U35, and converts that information into a collection of waveforms suitable for application to the Output Drivers 146 on the IC for application to the three power switches 122, 123 and 124 on the printed circuit board. The Control Logic is timed by a first connection to the Comparator Network 142 for response to the (Reset) waveform (D16 Q), to cause commutation of the switches 122, 123 and 124 at the commutation instants. The Control Logic is controlled for a forward or reverse sequence by two connections to the Forward-/Reverse Logic 149 (U112 Forward, U111 Reverse). The output ($\overline{PWM}$) from the Pulse Width Modulator 148 is coupled to the Control Logic to modify the output driving waveforms coupled to the output drivers to permit control of the power applied to the motor windings. The least significant bit (B0) is sensed by a connection to the Modulo 6 Counter 144 (D1 Q) for further use in connection with power control.

The output waveforms of the Control Logic 145 are the six waveforms AT, AB, BT, BB, CT and CB illustrated at the bottom of FIG. 3. These waveforms, whose sequences are reversed through operation of the Wall Control 105 or the Forward/Reverse Switch S1 on the printed circuit board (FIG. 2), provide for forward and reverse rotation of the motor. Similarly, the lined portions of the output waveforms illustrate those periods during which the respective output switches may be subjected to a duty cycle control through operation of the wall control or potentiometer R40 also on the printed circuit board (FIG. 2) for adjustment of the motor speed.

The Control Logic 145 consists of a first rank of 3 input NAND gates U36–U41 associated with reverse operation of the motor, a second rank of 3 input NAND gates U42–U47 associated with forward operation of the motor, a third rank of two input NAND gates U48 to U53 acting to multiplex the forward or reverse sequences to the Output Drivers 146. The Control Logic is completed by the gates U13 to U16, which respond to the least significant bit and to the pulse width modulation signals in achieving a continuous control of output power.

The logic elements of the Control Logic are connected as follows. The inputs of the Exclusive NOR gate U13 are coupled to D16 Q and D1 Q as previously noted. The output on gate U13 is coupled through inverter U14 to one input of the two input NAND gate U15 and to one input of the two input NAND gate U16. The other inputs of NAND gates U15 and U16 are connected to the pulse width modulator 148(U89) The output of NAND gate U15 is connected to one input of each of the three input NAND gates U37, U39 and U41 in the first rank of NAND gates associated respectively with the AB, BB and CB switching output pads of the IC and to U42, U44 and U46 of the second rank of NAND gates associated respectively with the AT, BT and CT switching output pads of the IC. The output of NAND gate U16 is coupled to one input of the NAND gates U36, U38 and U40 in the first rank of NAND gates associated respectively with the AT, BT, CT switching output pads of the IC, and to one input of the NAND gates U43, U45 and U47 in the second rank of NAND gates associated with the AB, BB, CB switching output pads of the IC.

One input of gate U36 and one input of the gate U43 are connected to the U31 output of the Modulo 6 Counter 144. One input of gate U37 and one input of gate U42 are connected to U34 in the Modulo 6 Counter; one input of gate U38 and one input of gate U45 are coupled to the output of gate U35 in the Modulo 6 Counter. One input of gate U39 and one input of gate U44 are connected to gate U32 in the Modulo 6 Counter. One input of the gate U40 and one input of gate U47 are connected to the output of U33 in the Modulo 6 Counter. One input of gate U41 and one input of gate U46 are coupled to the output of NAND gate U30 in the Modulo 6 Counter. Finally, one input of the gates of the first rank U36–U41 are coupled to the Forward/Reverse Logic (U111) for reverse operation; and one input of the gates in the second rank U42–U47 are coupled to the Forward/Reverse Logic (U112) for forward operation. The outputs of NAND gates U36 and U42 are connected to the inputs of the two input NAND gate U48. The outputs of NAND gate U37 and U43 are connected to the inputs of NAND gate U49; U38 and U44 outputs to the input of U50; U39, U45 outputs to the inputs of U51; U40, U46 outputs to the input of U52; and the outputs of U41, U47 to the input of U53. The outputs of the NAND gates U48–U53, as will be explained, are coupled to the Output Drivers for eventual connection to the separate output pads P7 (AT), P8 (AB), P10 (BT), P9 (BB), P11 (CT), P12 (CB) respectively. As earlier noted, these are the six waveforms illustrated at the bottom of FIG. 3.

The production of the output waveforms listed above may be explained as follows. The Q outputs of the flip-flops D1, D2, D3 forming the memory of the Modulo 6 Counter and illustrated in FIG. 3 establish the timing and duration of the Waveforms $\overline{CS0}$, $\overline{CS1}$, $\overline{CS2}$, etc. of the Modulo 6 Counter. Logical combinations of these waveforms taken two at a time by the gates U30–U35 in the Modulo 6 Counter produce waveforms having high portions of double count duration corresponding to the high portions of the output waveforms. At the separate stages of the three stage motor, this means that in the middle of the energization period for one stage (e.g., A), a second stage (e.g., B) is being de-energized while a third stage (e.g., C) is being energized so that two stages are being energized at all times.

The logical combination of the CS1, CS2 states, which appears at the output of gate U31 is coupled for forward operation of Switch A to one input of gate U43, the output of which is coupled via gate U49, in forming the AB drive waveform, and via output driver BOBA to the Pad P8. For reverse operation of the Switch A, the output of gate U31 is coupled to one input of gate U36, whose output is coupled via gate U48, in forming the AT drive waveform, and via output driver TOBA to the Pad P7.

The logical combination of the CS2, CS3 states, which appears at the output of gate U32 is coupled for forward operation of Switch B to one input of gate U44, the output of which is coupled via gate U50, in forming the BT drive waveform, and via output driver TOBB to the Pad P10. For reverse operation of the Switch B, the output of gate U32 is coupled to one input of gate U39, whose output is coupled via gate U51, in forming the BB drive waveform, and via output driver BOBB to the Pad P9.

The logical combination of the CS3, CS4 states, which appears at the output of gate U33 is coupled for forward operation of Switch C to one input of gate U47, the output of which is coupled via gate U53, in forming the CB drive waveform, and via output driver BOBC to the Pad P12. For reverse operation of the Switch C, the output of the gate U33 is coupled to one input of gate U40, whose output is coupled via gate U52, in forming the CT drive waveform, and via output driver TOBC to the Pad P11.

The logical combination of the CS4, CS5 states, which appears at the output of gate U34 is coupled for forward operation of Switch A to one input of gate U42, the output of which is coupled via gate U48, in forming the AT drive waveform, and via output driver TOBA to the Pad P7. For reverse operation of the Switch A, the output of gate U34 is coupled to one input of gate U37, whose output is coupled via gate U49, in forming the AB drive waveform, and via output driver BOBA to the Pad P8.

The logical combination of the CS5, CS0 states, which appears at the output of gate U35 is coupled for forward operation of Switch B to one input of gate U45, the output of which is coupled via gate U51, in forming the BB drive waveform, and via output driver BOBB to the Pad P9. For reverse operation of the Switch C, the output of gate U35 is coupled to one input of gate U38, whose output is coupled via gate U50, in forming the BT drive waveform, and via output driver TOBB to the Pad P10.

The logical combination of the CS0, CS1, states, which appears at the output of gate U30 is coupled for forward operation of Switch C to one input of gate U46, the output of which is coupled via gate U52, in forming the CT drive waveform, and via output driver TOBC to the Pad P11. For reverse operation of the Switch C, the output of gate U30 is coupled to one input of gate U41, whose output is coupled via gate U53, in forming the CB drive waveform, and via output driver BOBC to the Pad P12.

As already noted, forward rotation of the motor is provided when the Forward waveform is high and the Reverse waveform is low. Since the Forward waveform is high in the lefthand portion of FIG. 3, the waveforms of the counter states ($\overline{CS0}$, $\overline{CS1}$, $\overline{CS2}$, etc.) and the output switching waveforms (AT, AB, BT, etc.) to the left of the center of the figure illustrate forward operation. To the right of the center of the figure, the Forward waveform goes low and the Reverse waveform goes high. Accordingly, the waveforms of the counter states and output switching waveforms are reversed in sequence. Forward operation is provided by means of the gates U42–U47. Forward operation is enabled with a high due to the Forward waveform coupled to one input of each of the gates U42–U47. When all three inputs of U42–U47 are high, at selected times in forward operation, the outputs of selected pairs of these gates go low, and assist in forming the forward sequence of the output waveforms. During forward operation, all of the gates U36–U41 are quiescent due to a low of the reverse waveform on each of these gates.

Similarly, reverse operation is provided by means of the gates U36–U41. Reverse operation is enabled with a high due to the Reverse waveform coupled to one input of each of the gates U36–U41. When all three inputs of the gates U36–U41 are high at selected times in reverse operation, the output of selected pairs of these gates go low, and assist in forming the reverse sequence of the output waveforms. During reverse operation, all of the gates U42–U47 are quiescent due to a low from the forward waveform on each of these gates. The two input NAND gates U48–U53 are enabled for either forward or reverse operation and couple an input to the output drivers from either the active forward or the active reverse gates.

The output switching waveforms AT, AB, BT, etc. will be virtually as shown in FIG. 3 by the solid line high portions in a setting of the manual speed controls R40 and 105 (see FIG. 2) in which a maximum of power is applied to the motor windings. The amount of power that is applied is variable from a lower limit of no power to an upper limit of full power. Full power operation occurs when the two serially connected winding stages are energized 100% of the time. Duty cycling operation in the individual switching waveforms occurs in those regions defined by a solid line high in the output waveform and a dotted line low. For instance, the forward AT output switching waveform, has a high coincidental with the $\overline{CS4}$ low and the $\overline{CS5}$ low. The AT waveform has a dotted low for one Reset 1 pulse (equal to the width of the Reset (1) pulse) at the beginning of the $\overline{CS4}$ low or a dotted low delayed one Reset (1) pulse at the beginning of the $\overline{CS5}$ low, and continuing to the end of the $\overline{CS5}$ low. These two periods, as will be shown, are periods during which a 20 KHz waveform is subjected to pulse width modulation, which in one limit is not applied at all for a zero duty cycle and in the other limit loses the periodic component and becomes continuous for the 100% duty cycle. In the customary intermediate values of duty cycle, a square wave is produced having a 20 KHz repetition rate, and some ON and some OFF time.

The production of the dotted line "lows" in the output switching waveforms, during which duty cycled operation occurs, involves the gates U13, U14, U15 and U16. The waveform B0 (the least significant bit) from the memory D1 of the Modulo 6 Counter, is "exclusive NORed" with the Reset 1 pulse from the Flip-Flop (D16Q) of the Comparator. The Reset 1 waveform (referring to FIG. 8), commences at the commutation instant, and has a duration of about ⅓ of one commutation period in the fastest motor speed setting. In the slowest motor speed setting, the Reset 1 pulse has a duration of about 1/30th of one commutation period. The "exclusive" NORing of the two waveforms produces a high when both waveforms are low and a low when both waveforms are high, and produces a waveform at the output of gate U13 which is a delayed inversion of the B0 waveform having the same high and low durations, but delayed by the duration of the Reset 1 pulse as shown in FIG. 3. The output of gate U13 is then coupled to the input of the gate U16 and through the inverter U14 to the input of the gate U15. The duty cycled waveform ($\overline{PWM}$) is also supplied to the inputs of the gates U15 and U16. The U13 waveform is NANDed with a $\overline{PWM}$ output in U16 and the output of U16 is applied to the reverse gates (U36–U41). Similarly, the U13 waveform after inversion in U14 is NANDed with a $\overline{PWM}$ waveform in gate U15 and the output of gate U15 is coupled to the input of forward gates U42–U47.

Duty cycled operation occurs in the following manner when forward motor rotation is taking place. In forward rotation, the Forward waveform is high so that the forward gates U42–U47, which produce an active low output when all inputs are high, are enabled. Thus, an active low is produced in gates U42–U47 during the ON times (highs) of the duty cycled waveform, occurring during the highs of the respective output waveforms from gates U31–U35 of the Modulo 6 Counter. For example, during forward motor rotation, the gate U42 is active in formation of the AT output switching waveform. The output waveform from the gate U34, which corresponds to the AT waveform is high when $\overline{CS4}$ and $\overline{CS5}$ are low.

If the duty cycle setting is zero, and the output from U15 stays low, then the AT waveform is low for an initial portion of CS4 equal to the duration of Reset 1. It then becomes high for a commutation period. The AT waveform (with U15 held low) goes low after CS5 has gone low with a time delay equal to the duration of the Reset 1 pulse. If the duty cycle setting is for 100%, and the output from U15 stays high, then the AT waveform remains high for the duration of CS4 and CS5. If an intermediate setting of duty cycle is involved, then the AT waveform as illustrated in FIG. 3, is partially ON and partially OFF. During the CS4 low switching occurs at the 20 KHz rate for a period corresponding to the length of the Reset 1 pulse. The AT waveform then remains high (without duty cycling) for a commutation period, and then returns to duty cycled 20 KHz switching for the balance of the CS5 low interval. It should be noted that the start of the second portion of the duty cycled switching begins after a delay equal to Reset 1 from the beginning of the $\overline{CS5}$ low.

The waveforms to the left of FIG. 3 illustrate forward rotation of the motor and the output switching waveforms illustrating duty cycled operation. The left portion of the drawing is affected by start-up conditions during the low portion of the $\overline{POR}$ waveform. The I start waveform, for this paragraph's discussion, is assumed to be high at all times. After $\overline{POR}$ (low) is completed, the waveforms assume with their conventional regularity—until the middle of the page is reached. At the middle of the page, a reversal in rotation is indicated, and waveforms corresponding to a reversal are provided for the righthand portion of the figure. For forward rotation, assuming that the BB waveform is first, CT follows, then AB, then BT, CB, AT, BB, CT, etc. Two waveforms are always on together, and the duty cycling occurs first (after $\overline{POR}$) on the ("B" for bottom) ground connected switch (BB). Duty cycling occurs second on the ("T" for top) VDD connected switch (CT). Duty cycling occurs next on the ground connected switch (AB), next on the VDD connected switch (BT), etc. Each successive time, the switch connection alternates between a Vdd and a Vss (ground) connection. In addition, at any instant, two highs exist—but one is duty cycled and one is not duty cycled. While this method of alternation causes a shift in the voltage of the winding neutral, the differential amplifier has very good common mode rejection, and by connecting both ends of the winding stage being measured to the differential inputs of the amplifier, the error produced is negligible. The duty cycled sequence, in addition, is adjusted so that as a winding is de-energized the next winding to be energized has a sense to absorb the turn-off transient. The Reset 1 pulse is therefore selected to have a duration approximately equal to the duration of this transient or slightly longer. The effect is to produce smoother motor operation.

OUTPUT DRIVERS 146

The control IC has at its output 6 separate output buffer amplifiers TOBA, BOBA, TOBB, BOBB, TOBC, AND BOBC coupled to the output pads P7, P8, P10, P9, P11 and P12 respectively. The letter assignments having a coded meaning. The first two letters designate whether switched connection is to be made between the winding stages and B+ or ground potential; "TO" for top means connection to B+ potential, while "BO" for bottom means connection to ground potential. The third "B" means buffer amplifier. The fourth letter, A, B, or C denotes whether connection is made to the A, B, or C winding state. The output switching waveforms produced by the buffers (in the order already cited) are respectively at the AT, AB, BT, BB, CT and CB. Here, the initial letter designates the winding stage, and the terminal letter determines whether it is designed for load connection to B+ or to ground potential. The output switching waveforms are those shown as the bottom 6 waveforms illustrated in FIG. 3. The waveforms with a final "T" indicate that they are to be connected to the base of Q82 in switch A or its counter-part in switches B or C for connection to B+ potential. The waveforms with a final "B" indicate that they are to be connected to the gate of Q91 in switch A or its counterpart in switch B or C for connection to ground potential. The conduction periods that are produced in the top and bottom switches correspond to the highs in the waveforms, with the vertical lines indicating duty cycled operation, as earlier explained.

The logical design of the Output Drivers 146 is illustrated in FIG. 9. The "Top" buffers are each two stage amplifiers consisting of two successive inverters designed to drive the Top portion (Q82, etc.) of the switches A, B and C. The "Bottom" buffers, each consist of a two input NAND gate in the first stage followed by an inverter in the second stage designed to drive the Bottom portion (Q91) of the switches A, B and C. The second input of each NAND gate is connected to the POR 150 for application of the I start waveform. The effect of an inhibition of the bottom buffers is to prevent the application of power to the motor, since both a top and bottom switch must be conductive for power to flow to the winding stage. As will be explained in connection with the POR 150, upon starting the motor, power is not applied to the windings until the fifth count ($\overline{CS5}$) in operation of the Modulo 6 Counter 144.

OSCILLATOR 147 AND PULSE WIDTH MODULATOR 148

The Oscillator 147 is used for two purposes on the Control IC. In the operation of the Autonull Circuit, the Oscillator output controls the counting rate used to decrement the offset current in nulling the Amplifier 141. The Oscillator 147 and the Pulse Width Modulator 148 together enter into the adjustment of the speed of the fan motor. The electronically commutated motor is designed to operate at a speed established by the amount of electrical power supplied to the motor. When more electrical power is supplied, the motor rotates at a higher rate and when less electrical power is supplied, the motor rotates at a lower rate. In the present embodiment, the amount of power supplied to the fan motor is subject to control from approximately 100% to less than 1% of maximum power. This range of power adjustment produces at least a 200:10 rpm speed range. The AT, AB, BT, BB, CT, CB waveforms illustrated in FIG. 3 depict the mode of application of duty cycled energization to the motor windings. The creation of these waveforms based on the supply of a pulse width modulated waveform from the Pulse Width Modulator 148 has been described in connection with the Control Logic 145 and the Output Drivers 146. The present discussion deals with the Oscillator 147 and the Pulse Width Modulator 148 in the creation of that waveform, a combination which facilitates the wide range of motor speed adjustment sought herein.

The Oscillator 147 is a relaxation oscillator. The circuit elements of the Oscillator external to the IC are shown in FIG. 2. Those circuit elements on the IC are shown in FIG. 10A. It comprises a capacitor C6, a transistor Q42 for recurrently discharging the capacitor and a resistor R24 for recurrently charging the capacitor. The Oscillator circuit also includes two comparators (COM 4 and COM 5) for setting the limits of the voltage swing of the relaxation oscillator, each comparator being followed by an inverting hysteresis gate, U87, U88, a flip-flop comprised of NAND gates U90, U91, a reference voltage comprising transistors Q47, Q48, Q49, resistors R9 and R10, and a protective network including resistor R11 and diodes D2 and D3.

The elements of the Oscillator are interconnected as follows. The capacitor C6, which is external to the integrated circuit, has one terminal connected to pad P15 and the other terminal connected to the system ground. The resistor R24, which is also external to the integrated circuit, is connected between pad P13 to which the source of Vdd voltage is applied and the pad P15. The N-channel transistor Q42 has its drain connected to pad P15 and its source connected to IC ground. The drain of transistor Q42 is also connected via 250Ω resistor R11 to the positive input of the comparator COM 4 and to the negative input terminal of comparator COM 5. The negative input terminal of the comparator COM 4 is connected to the voltage reference circuit at a point having a normal potential of 1.8 volts. The positive input terminal of comparator COM 5 is connected to a voltage reference (Vref5) having a potential of 0.75 volts. The output terminal of the comparator COM 4 is connected via the inverting hysteresis gate U87 to one input terminal ($\overline{S}$) of the NAND gate U90. The output terminal of the comparator COM 5 is connected via the inverting hysteresis gate U88 to one input terminal ($\overline{R}$) of the NAND gate U91. The other input of the NAND gate U90 is connected to the output of the NAND gate U91, at which the $\overline{Q}$ output of the Flip-Flop appears. The other input of the NAND gate U91 is connected to the output of the NAND gate U90 at which the Q output of the Flip-Flop appears. The Q output of the Flip-Flop (U90, U91) is connected to the gate of Q42. The output of the oscillator $\overline{CLK}$ in the form of a rectangular pulse having a short interval duration of approximately 300 nanoseconds and a pulse repetition rate of 20 KHz is coupled from the output of U91 to U93 in the Autonull Circuit for timing the counting rate.

The voltage reference and the remainder of the Oscillator circuit components are interconnected as follows. The P-channel transistor Q47, of 4/8 geometry, has it source connected to Vdd, its gate connected to IC ground, and its drain connected via 1.6 K resistor R9, and 1.6 K resistor R10 to the drain of the N-channel transistor Q49, of 50/4 geometry. The gate and drain of Q49 are connected together, and the source of Q49 is connected to IC ground. The 1.8 volt reference coupled to the negative input terminal of COM 4 appears at the drain of Q49. Protective diodes D2 and D3 are serially connected between Vdd and IC ground, their interconnection being connected to the positive input terminal of COM 4 and the negative input terminal of COM 5.

The Oscillator operates as a relaxation oscillator whose amplitude is defined by the limits set by the voltage references at the comparator inputs. Waveforms useful to understanding oscillator operation are provided in FIG. 10B. When first energized, capacitor C6 begins to charge toward Vdd, the voltage on the capacitor C6 appearing at the inputs of both comparators. When the voltage exceeds PWM "Ref" (+1.8 volts), COM 4 sets the Flip-Flop, and the Q output goes high, turning on Q42, which discharges the capacitor C6. When the voltage on C6 falls below Vref 5 (+0.75 volts), COM 5 goes high, resetting the Flip-Flop, with Q low and turning off Q42. Since the discharge of C6 is extremely fast (for the values of R24, C6 shown), and COM 5 has a finite response time, the voltage on C6 tends to fall all the way to ground. The capacitor C5 then begins to recharge, and the cycle repeats. The output waveform ($\overline{\text{CLK}}$) appearing at the output of U91 is coupled to U93 of the Autonull circuit. The waveform appearing at the capacitor C6 is the sawtooth waveform in the upper part of FIG. 10B. The CLK waveform is the rectangular pulse superimposed on the sawtooth waveform. The duty cycle, as earlier noted, for the clock waveform is <1%, using the indicated parameters. The selection of the parameters is designed to create a relatively linear sawtooth waveform on the capacitor C5.

The Pulse Width Modulator 148 utilizes the sawtooth capacitor waveform and provides an output waveform (i.e., $\overline{\text{PWM}}$ output), which is selectively either always off; on some off some; or always on. The ratio of on-to-off time (i.e. Pulse Width) is controlled by the setting of the external potentiometer R40 or the wall speed control 105. These three possibilities are described in FIG. 10B.

The Pulse Width Modulator comprises the external potentiometer R40, external transistor Q81, external resistances R25, R26, R27, R29, R30 and external capacitor C4 associated with "Regulate" pad P14 and the comparator COM 6, and hysteresis gate U89 on the IC. The 100 K ohm potentiometer R40 has its end terminals connected between Vdd (pad P13) and the system and IC ground (pad P6). The tap on the potentiometer R40 is connected via the 150 K resistor to the pad P14. The 2.2 μf capacitor C4 and the 39 K resistor are connected between the pad P14 and system ground. PNP transistor Q81 has its collector coupled to pad P14, its base connected to the tap on a voltage division network comprising 430 K resistor R26 connected to the 150 volt supply and 36 K resistor R27 connected to system ground, and its emitter connected via 36 K resistor R25 to Vdd. The principal collector load is the 39 K resistor R30 connected between the collector of Q81 and system ground.

On the IC, the comparator COM 6 has its negative input terminal coupled to the pad P14, and its positive input terminal coupled via the resistance R11 to the capacitor C6. The output of the comparator COM 6 is coupled to the inverting hysteresis gate U89 at the output of which the $\overline{\text{PWM}}$ output appears.

The limits and an intermediate form of the $\overline{\text{PWM}}$ output wave are illustrated in FIG. 10B. The duty cycle is affected by both potentiometer R40 and the wall control 105. When the potentiometer R40 is set very low, the negative input of the comparator is always below the voltage on the capacitor C6, and the COM 6 output is high. The $\overline{\text{PWM}}$ output derived from U99 is always low. When R40 is set very high, the comparator output is always low, and the $\overline{\text{PWM}}$ output is always high. When R40 is set at an intermediate position between the limits of the oscillation voltage appearing across the capacitor, the $\overline{\text{PWM}}$ output waveform is high part of the time and low part of the time. Since the capacitor voltage is controlled to rise and fall substantially linearly, the practical linear adjustment range of the duty cycle is very close to the 0 to 100% absolute limits.

Figure 10C:
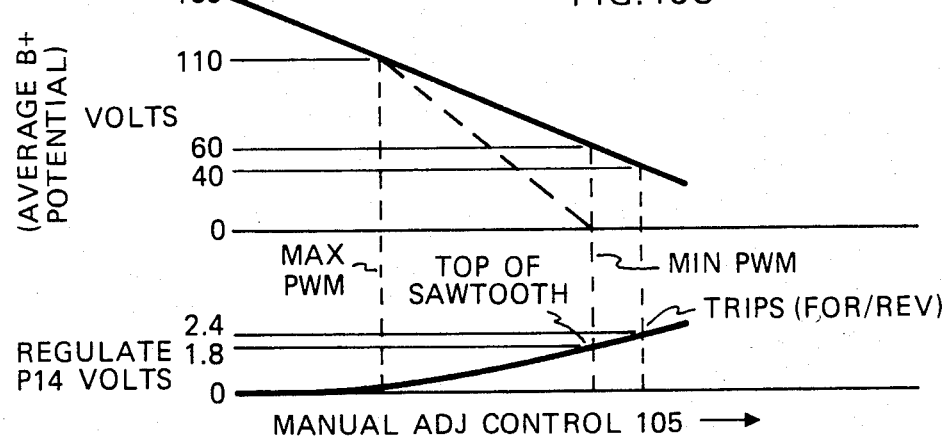
FIG. 10C is a plot of the effect of manual operation of the wall control upon motor speed and direction of rotation.
Figure 10D:
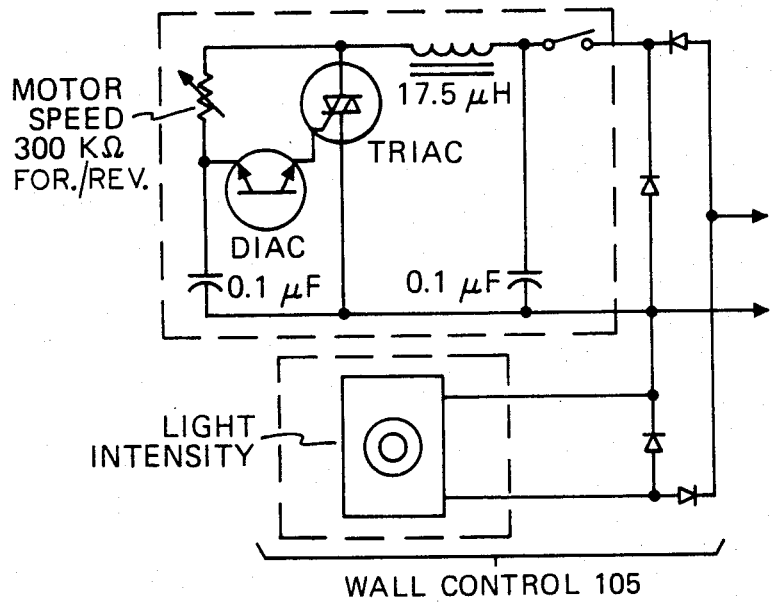
FIG. 10D is a simplified showing of a switchable wall control for motor speed and direction.

FIG. 10C, which also applies the Forward/Reverse Logic, illustrates how the duty cycle is affected by the wall control 105. When the wall control is used, the maximum B+ voltage is limited to about 135 V. Downward adjustment of the motor potentiometer in the wall control reduces the B+ (+135 V) applied to the motor. Initial downward adjustment of the control brings about a reduction in speed by a reduction in the voltage applied to the motor. After the voltage has been reduced from a nominal value of 150 volts to approximately 100 volts, further downward adjustment of the wall potentiometer brings about simultaneous downward adjustment of the B+ and the imposition of a pulse format upon the output waveform, whose duty cycle is gradually decreased. This is illustrated in FIG. 10C. The duty cycle is controllable by this control from 100% to nearly 0% as indicated in relation to the adjustment of R40.

The operation of the wall control 105 involves the components earlier named connected to the Regulate pad P14. These include the transistor Q81 and resistors R25, R26, R27, R29, R30 and R40. Operation of the wall control adjusts the average voltage applied to the motor. The maximum voltage (e.g. 135 volts) produces the maximum speed. Decreasing the average voltage by means of the wall control produces a substantially linear reduction in voltage applied to the motor as indicated by the upper solid line. (When this reduction begins, let us assume that R40 is set at the maximum value.) At the maximum value, Q81 is biased off by an approximately 1.4 volts difference between its emitter voltage, which is defined by the Zener diode CR1 at 9 volts above ground, and the base voltage, which is defined at about 10.4 volts by the voltage divider formed by R26 and R27 connected between the 135 V B+ terminal and ground. As the B+ potential is adjusted down, the voltage on the emitter connected to the Zener diode remains constant, while the voltage on the base connected to the voltage divider falls in proportion to the reduction in B+ potential. At about 110 V B+, the reverse bias on Q81 is removed, and adequate forward bias provided to overcome the junction drop, and initiate conduction. To this point, in the downward adjustment of the potential, the voltage on the Regulate pad P14 has been unaffected, and has remained at zero potential. Beyond this point, conduction by transistor Q81 between Vdd and the Regulate pad causes the voltage on the pad to increase. Any slight increase in voltage raises the threshold of U89, and causes a decrease in the Pulse Width. The joint reduction in absolute B+ voltage and in the duty cycle produces an increased rate of decrease in average voltage. At about 60 volts, a minimum rotation rate (just above the stalling speed of the motor) is achieved and the PWM duty cycle is near zero. For a REG voltage equal to about 2.2 volts, the PWM duty cycle and speed are both zero. At this point any further decrease in voltage provides no further decrease in speed of the motor, but rather a further elevation of the voltage on the Regulate pad. This last range of adjustment permits the voltage increase on the Regulate pad to signal a reversal in rotation by tripping a comparator set at 2.4 volts, as will be described in connection with the Forward/Reverse Logic 149.

Control of the rate of rotation of the fan motor is achieved by a combination of an initial reduction in the B+ voltage supplied to the fan motor followed by the utilization of a pulse width modulated form of energization in which further reduction of the B+ supply is accompanied by a progressive narrowing of the energizing pulses of fixed repetition rate. As the voltage is further reduced, a minimum point is reached at which there is essentially no "on" time for the pulses and the energization is essentially cut off. The practical range of speed adjustment exceeds 200:20 rpms.

To get a 10:1 speed control range using a variation of B+ supply voltage only would require a 10:1 range of voltage. This is difficult to do and still use a single zener diode power supply to power the IC from the B+ supply. By proportionately reducing pulse width with B+ voltage reduction, a 10:1 speed range can be obtained with only a 2 to 3:1 variation in B+. The B+ supply voltage variation is used in order to control motor speed with the wall control. If a wall control is not used, the full speed range can be obtained using PWM only.

Achieving this range of control requires a system capable of stable operation at both the upper and lower limits of operation. This has been achieved by the avoidance of a pulse by pulse feedback loop for current control, and the use of a higher PWM rate. The present arrangement, which uses an open loop pulse width modulation configuration is particularly advantageous when it is desired to achieve the present wide range of control. Open loop operation is characterized in a block diagram in FIG. 10E. The applicable waveform is the AT waveform of FIG. 10F, also illustrated with less detail in FIG. 3.

In the FIG. 10E illustration, the motor speed is set by an energy balance between a mechanical load imposed on the ECM motor 206 primarily by the fan 207 and the electrical energy supplied to the motor and determined by the operator. The block diagram illustrates a manually adjusted potentiometer 203 whose end terminals are connected between Vdd and ground and whose tap is connected to the negative input terminal of comparator 202. The positive input terminal of the comparator 202 is coupled to the output of a source of sawtooth waveforms 201. The comparator 202 output is coupled to Electronic Gating 205. Power is supplied to the Electronic Gating 205 from the dc power source 204. Power is derived from Electronic Gating by three separate connections (A, B, C) to the three winding stages of the ECM 206. The output of the comparator, depending upon the setting of 203 produces an output waveform which is a sustained logical "one", a pulsed logical "1" having a fixed 20 KHz repetition rate whose duration is determined by the setting of 203 or finally, a sustained logical "zero".

The intermediate case is illustrated in FIG. 10E. The Electronic Gating 205 is primarily the Control Logic 145 whose function is to provide gating in response to the pulse width modulation which appears at U89 and in response to the output of the Modulo 6 Counter which defines the double commutation periods for energizing the separate winding stages. The setting of the input of the comparator is determined by the operator when he sets the voltage at 203. This arrangement provides a full range of control and does so with the required stability at both the upper and lower limits. While lacking the drift stability of a closed loop feedback system, the open loop system has the advantage of simplicity, and any slight drift which might occur is not ordinarily objectionable.

The objective of open loop PWM (pulse width modulation) operation is to avoid anomalies due to time delay which occur in closed loop PWM systems. Specifically, in feedback PWM systems the system is turned on and then turned off at a later time by some motor related parameter such as current or voltage. There is a minimum pulse width that can be thus generated which corresponds to the total time delay of the system including the turn-off delay of the power transistors. If an attempt is made to generate a PWM pulse which is shorter than the system time delay, the system will either jump to zero from some finite value or it will duty cycle back and forth between zero and this minimum finite value, in a bang-bang way, trying to achieve the "forbidden" setting by averaging over many pulses some of which are too large and the others of which are zero.

The avoidance of these anomalies sets requirements upon the manner of adjusting the variable level and the mode of generation of the periodic waveform, the two being illustrated as the inputs to the comparator 202 of FIG. 10E. Requirements are also placed upon the relationship of one to the other.

In the disclosed embodiment, the user of the fan may look at the fan, determine whether it is going at the desired speed and make an upward or downward adjustment. The adjustment, once made is essentially independent of what happens to the motor and the power circuit, and when the user has moved away from the control and is no longer regulating by hand and by eye, this operation is also open loop.

The control 203 need not be manually adjusted in the manner just described, however. The adjusted level may be part of a power sensing, current sensing, cooling sensing, etc. feedback system in which average levels of slowly varying parameters such as average currents, average temperatures, etc. may be used. It is thus possible to have an open loop modulator used in a closed loop motor system.

The adjustable level in the PWM input must meet two criteria. It should not be instantaneously responsive to motor circuit parameters nor have any frequency components comparable to that of the repetitive wave such as would disturb the distance between intercepts used to define the active state of the comparator output and thus the duty cycle of the PWM waveform. Rephrased, the adjustable wave should not have any components whose rate of change is comparable to the rate of change of the repetitive waveform.

Another requirement is that the repetitive waveform should be independent of the motor in a strict sense in that in both the short term and in the long term there is no relationship between them. In the actual embodiment, the oscillator is powered from the same DC supply as the motor but the supply is controlled by a Zener voltage regulator and DC levels as well as short time current instabilities are precluded from affecting the oscillator frequency, amplitude, or waveform. If these conditions are maintained, then the motor speed is adjusted throughout essentially all of its range without any unevenness in the motor speed function.

The present arrangement achieves a large range of speed adjustment with quiet operation. The continuous control range is from approximately 0% to 100% duty cycle adjustment corresponding to a rate of rotation of approximately 10 rpms to approximately 200 rpms maximum. At near zero duty cycle, the power switches do not fully turn on and operate in an analog fashion down to 0 duty cycle. The pulse to pulse feedback systems on the other hand are usually restricted to 5% to 95% duty cycle adjustment because of limitations in the delay times of available low cost semiconductor switches and the delay times in the signal logic itself.

Economics normally dictates that the repetition rate of the pulses be in excess of the audible limits (20 KHz) but not so significantly above audible limits as to require high cost, high frequency transistor switches. An economically practical limit is approximately 30 KHz.

In practical circuits using NPN devices, the sawtooth waveform has a very accurate positive peak and a not too accurate lower peak. This is because the positive peak is associated with the turn on of a device while the negative peak is associated with the turn off of the device. For this reason the 0% modulation is associated with the positive peak which occurs at approximately 2 volts and the 100% modulation is associated with the negative peak which occurs at ground, since smooth modulation to 0% is more critical. The turn-on time always embraces the positive peak, the turn-off time the negative.

THE FORWARD/REVERSE LOGIC 149

The Forward/Reverse or direction control Logic is responsive to the setting of the forward/reverse switch S1 coupled to the pad P16 on the IC, and to a controlled diminution in the B+ supply, effected by the wall motor speed control. An inversion in the logic state of the output of 149 causes an inversion in the counting sequence and a reversal in the sense of rotation of the motor.

The direction control Logic 149 comprises the transistor Q48, the comparator COM 7, hysteresis gate U113, the flip-flops D13, D14, D15, exclusive OR gates U107, U110, and NOR gates U111 and U112. External to the IC, the transistor Q81; resistors R25, R26, R27, R29 and R30 (mentioned in connection to PWM 148); and the switch S1 enter into forward/reverse operation.

The comparator COM 7, which is the heart of the control, has its positive input terminal coupled to the "REG" pad P14 and its negative input terminal coupled to an internal reference (Vref 9) at 2.4 volts. The potential at pad P14, while affected by the setting on potentiometer R40, will not change the state of COM 7. The state of COM 7 may be changed only by adjustment of control 105, which affects the state of conduction of Q81, as earlier described.

The negative input terminal of COM 7 is connected to a voltage reference to which hysteresis is added at the moment that switching takes place. The input connection is made to the drain of the P-channel transistor Q47, which is never less than 1.8 volts irrespective of reductions in B+. The drain of Q47 is connected via serially connected resistances R9, R10 and transistor Q49 (with interconnected gates and drain) to ground. The PWM reference voltage of 1.8 V appearing across Q49 is used as the reference to set the maximum amplitude of the sawtooth waveform. By adding the voltage drops across R9 and R10 to this level (1.8 V) and coupling the resulting voltage to the negative input terminal of COM 7, the trip point for COM 7 is set in a manner which assures that reverse always occurs below zero speed. One of the two outputs taken from COM 7 is connected via an inverting hysteresis gate U113 to the C input of the flip-flop D15. The other output of COM 7 is connected to the gate of N-channel transistor Q48 of 500/4 geometry, whose drain and source are connected to shunt resistance R9. When Q48 becomes conductive as the COM 7 output goes high upon sensing an increase in voltage at P14 in excess of the Vref 9, it reduces the voltage on Vref 9 by approximately one quarter volt. This introduces hysteresis which makes the reversal more positive acting, assuring that only a single reversal occurs every time VREG exceeds Vref 9.

The reduction in B+ is coupled to the forward-/reverse circuit in the following manner. When the B+ voltage is reduced by wall control 105 to a point where Q81 becomes conductive, the voltage on the Regulate pad P14 monotonically increases as shown in FIG. 10C. (It is assumed that R40 is set at a maximum clockwise position when the wall control 105 is used.) Adjustment of wall control 105 over the normal range of PWM control leads to a final value of 1.8 volts. Adjustment past 1.8 volts produces a voltage peak in excess of 2.4 volts. The comparator COM 7 is set to trip the Forward/Reverse Logic at about 2.4 volts.

The setting of R40 does not interfere with the reversal achieved by control 105 and will not itself produce a reversal in motor rotation. So long as Q81 is nonconductive, the voltage on the Regulate pad P14 is determined by the setting of the potentiometer R40 and resistors R29 and R30. With Q81 nonconductive, the configuration sets a maximum voltage on the Regulate pad P14 of approximately 2.2 volts, when the tap on R40 is at Vdd (and no reversal will occur). The 2.2 volts is used to assure that minimum speed is reached even under worst case conditions. The minimum value of zero volts occurs when the tap on R40 is at ground. When transistor Q81 becomes conductive by a suitable fall in B+ voltage with adjustment of 105, the voltage on the Regulate pad P14 will increase toward Vdd as shown in FIG. 10C. The setting of R40, which is isolated by the 150 K ohms of R29, has only a slight affect on the FIG. 10C characteristic.

In normal operation, the operator, when it is decided to reverse the fan motor rotation, reduces the manual control to its lowest speed setting, which first reduces the speed to a minimum value (stalling), and then continues past that setting to a value which trips the reversing comparator COM 7. Since the setting is too low for use, the operator returns the setting forward to the desired speed of rotation. In this manner, the speed characteristic illustrated in FIG. 10C is reproduced in the course of either a speed increase or a speed decrease.

The output of U113 is connected to the C input of flip-flop D15. The R input of D15 is connected to the POR 150 (U120). The $\bar{Q}$ output of D15 is connected to the D input of D15, and the D15 Q output is connected to one input of the exclusive OR gate U107. The other input of the gate 107 is connected to pad P16 for application via single pole, double throw switch S1 to either Vdd or system ground potential. Switch S1 provides the permanent memory for motor direction, and determines the direction of rotation when power is first applied.

The output of the exclusive OR gate U107 is connected to the D input of flip-flop D13, which together with flip-flop D14, provides at least one clock pulse of delay before a reversal can occur. The Q output of D13 is connected to the D input of flip-flop D14. The CLK signal is connected to the C inputs of D13, D14. The exclusive OR gate U110 has one input connected to the output of U107 and one input connected to the Q output of D14, from which is coupled an input of U116 (in POR 150). The $\bar{Q}$ output of D14 is coupled to an input of U115 (in POR 150). NOR gate U111 has one input connected to the output of exclusive OR gate U110, and one input connected to D14 Q. NOR gate U112 has one input connected to the output of exclusive OR gate U110 and one input coupled to D14 $\overline{Q}$. The output of U112, at which the Forward waveform appears, is coupled to gate U112 in the Modulo 6 Counter and after two successive inversions in U12, U7 is coupled uninverted to the gates of U42–U47 of the Control Logic. The output of NOR gate U111, at which the Reverse waveform appears is coupled to the gates U36–U41 in the Control Logic.

The output state of the Forward/Reverse Logic is defined by the state of D15, which is in turn dependent on the state of COM 7, and on the settings of switch S1 connected to pad P16. When the installation is first turned on, D15 is reset (Q low) by the POR. If P16 is connected to ground by S1 (a logical low), then with two lows at the input of U107, a low is produced at the U107 output. This produces one low immediately at the input to exclusive OR gate U110. Meanwhile, after a 1 to 2 clock pulse delay, D13 Q and D14 Q have gone low. With two lows at the input to U110, the U110 output goes low. This causes U112 (forward) to go low, and U111 (reverse) with inputs which are connected to D13 Q and U110 (both low), to go high, and reverse operation to occur.

If switch S1 is set high, D15 Q being low, then the exclusive OR gate U107 output goes high, and a high is propagated directly and indirectly via D13 Q, D14 Q to exclusive OR gate U110. The output of gate U110 goes low after a delay of at least one clock pulse, and NOR gate U112, with lows at both inputs, goes high for forward operation.

The delayed operation of at least one pulse is achieved by the insertion of D13 and D14 in the signal path in parallel with the U107 output; and the application of the delayed and undelayed signal to the exclusive OR U110. The exclusive OR produces no high unless both inputs are different. Thus, it acts to defer the transmission of a high to the output gate U110 until the delayed and undelayed waveforms have reached the gate U110 output. The logical use of the Q and $\overline{Q}$ outputs of the flip-flops allows the delay to occur with both a change to reverse or a change to forward rotation.

The direction control logic 149 produces output signals at U111 and U112 for control of the direction (clockwise/counter clockwise; or Forward/Reverse) of motor rotation. The absence of an active output signal from U111 or U112 inhibits any input to the winding stages. The active outputs (highs) for U111 (Reverse) and U112 (Forward) never coexist, and an interruption occurs for long enough to protect the solid state switches 122-4 after one active state is terminated, before the other active state starts.

The Forward and Reverse waveforms have been illustrated in the waveforms of FIG. 3 and assume a logical high or low. The connections of the output of the Forward/Reverse Logic 149 are made to the Commutation Counter for inverting the count sequence within the counter (U8, U9, U20, U21), as earlier described, and to the Control Logic for selecting the forward (U42–U47) or reverse (U36–U41) "decoders" for achieving the correct switching sequence in the output drivers 146.

POWER ON RESET 150

The Power on Reset or Protection Circuit 150 senses Vdd as it increases after power is first turned on (i.e. "Power On") and holds certain portions of the logic in an initial state (i.e. "Reset") until the appearance of sufficient Vdd voltage gives assurance that the logic is valid. It performs a similar function after power is turned off. When power is turned on, it also dictates the initial operation, which is nulling of the Amplifier 141 before it is used for integration timing.

In addition, the POR 150 precludes the application of power to the motor windings until other portions of the control IC have been properly initialized and are ready to perform the normal control functions. The present POR circuit performs its function with the addition of an external pad, and does not require the provision of an additional capacitor.

The analog and digital portions of the POR Circuit 150 are illustrated in FIG. 11A. The input voltages to the comparator (COM 8 of the POR), illustrating the operation of the POR in response to increasing Vdd upon turn on, are illustrated in FIG. 11B. The waveforms derived from the POR 150 are shown in FIGS. 3, 12A and 12B.

The Power On Reset 150 maintains an initial reset condition by means of the $\overline{POR}$ waveform responsive to the instantaneous value of the Vdd voltage. The $\overline{POR}$ waveform becomes inactive when the Vdd voltage exceeds the desired threshold (i.e. 7 volts). The $\overline{POR}$ waveform is coupled to the Set inputs of the flip-flops D16, D17 of the Comparator Network 142; to the Reset inputs of the flip-flops D1, D2 and D3 (assuring a 000 initial state) in the Commutation Counter; and to the Reset input of D15 of the Forward/Reverse Logic 149, assuring a return to the state (Forward or Reverse) established by the position of S1. The D17Q output is coupled via U92 to D7, and D7Q opens gate U85, disconnecting the Amplifier 141 from capacitor C5. When the Amplifier is reconnected after nulling, a significant (6 μA) current (IST) is injected into (R4D-D) of the Integrating Amplifier in a sense to cause a discharge of capacitor C5, via gate U85, below the comparator COM 2 threshold (3 volts). This current, which is interrupted during each of four subsequent nullings, prevents the Amplifier from "hanging up" in a Vdd saturated state upon turn on, but is not so great as to interfere with the reset of the capacitor C5.

The Vdd sensing portion of the POR Circuit 150 comprises the transistors Q52–Q59, the comparator COM 8 and the non-inverting hysteresis gate U120. The positive terminal of the comparator is connected to a first series circuit comprising diode D1 and N-channel transistors Q58 and Q59. The negative terminal of the comparator COM 8 is connected to a second series circuit comprising the P-channel transistors Q52–Q57.

In the first series circuit, the anode of D1 is connected to the source of Vdd potentials and the cathode is connected to the gate and drain of N-channel transistor Q58 of 500/4 geometry. The source and body of Q58 are connected together and to the drain of N-channel transistor Q59 of 4/40 geometry. These three connections are interconnected to the positive input terminal of the comparator COM 8. The source of Q59 is connected to the IC ground. The gate of Q59 is connected to the Vdd source. The foregoing connections apply a potential to the positive input terminal of comparator COM 8 which is equal to the instantaneous Vdd voltage less a constant, which is equal to the voltage drop in diode D1 and drop in Q58. This is approximately 1.4 volts.

The negative input terminal of comparator COM 8 is connected to a second series circuit in which the slope is a fixed fraction (K < 1) of the Vdd voltage and which is provided with hysteresis to insure positive operation of the POR. In particular, P-channel transistor Q52 of 10/6 geometry has its drain connected to the source of transistor Q54. P-channel transistor Q54 of 100/4 geometry has its drain connected to the source of Q55. P-channel transistor Q55 of 25/4 geometry has its gate and drain joined, and the two electrodes are connected to the source of Q56. P-channel transistor Q56 of 25/4 geometry has its gate and drain joined, and the two electrodes are connected to the source of Q57. P-channel transistor Q57 of 25/4 geometry has its gate and drain connected to IC ground. The P-channel transistor Q53 of 20/6 geometry has its source connected to Vdd. The gate and drain of Q53 are joined and connected to the gate of Q52, to the drain of of Q54 and to the negative input terminal of COM 8. The output terminal of COM 8 is connected to the gate of Q54 for effecting hysteresis.

The output terminal of comparator COM 8 is connected to the input terminal of the non-inverting hysteresis gate U120. The $\overline{POR}$ output waveform is derived from the output of U120.

Upon energization, the output of comparator COM 8 arrives at a logical "low" value once Vdd is in excess of several volts and so remains until the trip point occurs (at a Vdd of about 7 volts).

As shown in FIG. 11B, the trip point of the comparator COM 8 occurs when the voltages at its positive and negative inputs intersect. At this point, the $\overline{POR}$ waveform goes to an inactive high. The voltage of this intersection is designed to be at a level which allows the logic in the digital ciruitry of the IC to become valid and the analog circuitry, particularly that involved in nulling, to become functional. This voltage is set at approximately 7 volts for an upward change in Vdd and 6.5 volts for a downward change in Vdd as a result of the provision for hysteresis.

The foregoing trip point is determined by two independent variables characterizing the series circuits associated with the positive and negative input terminals, respectively, of the comparator COM 8. The first is the voltage offset provided by the diode D1 and Q58 in the first series circuit at the positive input terminal of the comparator, it being assumed that the slope of the resulting input voltage is unitary as a function of Vdd. The second independent variable is the voltage division ratio of the second series circuit, which is coupled to the negative input terminal of the comparator COM 8 and which is assumed to act as a simple resistive voltage divider. The fraction K has a value of 0.8 for an intercept at about 7 volts. These values are approximate and appreciable latitude is to be expected.

Hysteresis is provided by the output connection of the COM 8 to the gate of Q54. If the output of COM 8 is low, Q54 is conductive and, similarly, Q52 in series with it is conductive. Thus, current is provided to the transistors Q55, Q56 and Q57 via both transistors Q52 and Q54 in one path and Q53 in the other path. When the output of COM 8 goes high, then Q54 and Q52 are disabled to conduct current in parallel with Q53, and the voltage at the negative input to COM 8 falls from 5.53 to 5.41, or 120 millivolts, implying a lower conductance. The change in the Vdd threshold is approximately ½ volt and insures a positive switchover.

The output circuitry of the POR circuit 150 responds to both the state of the Vdd as sensed at the comparator COM 8 and to the state of the other circuits on the IC which are caused to go through a preliminary series of simulated commutations by the POR. The output circuitry of the POR consists of the SR flip-flop U118, U119, the NOR gate U86, the three NOR gates U115, U116, U117 and the transistors Q69 and S9. The five commutation count duration of the IST and I start POR waveforms is derived from a connection of U115, U116 to U25, U29 of the Commutation Counter 144. The connection of U118, U119 to U86, and U86 to D7$\overline{Q}$ of the Autonull Circuit 193 causes the Ist waveform to be delayed until after the first nulling, and interrupted for the next four nullings. The circuit is as follows.

The SR flip-flop consists of two, two terminal NAND gates U118 and U119 with the $\overline{R}$ input being responsive to the Modulo 6 Counter and to the Forward/Reverse Logic, and the $\overline{S}$ input being responsive to the state of the Vdd (COM 8, U120). The outputs of the two NOR gates U115 and U116 are connected to the input of the two input NOR gate U117. One input of the two input NOR gate U115 is connected to the $\overline{CS5}$ output of the Modulo 6 Counter and the other input of U115 is connected to the D14 $\overline{Q}$ of the Forward/Reverse Logic. One input of the two input terminal NOR gate U116 is connected to the Modulo 6 Counter for application of the $\overline{CS1}$ waveform. The other input of U116 is connected to the D14 Q output of the Forward/Reverse Logic. The two outputs of NOR gates U115 and U116 are connected to the two respective inputs of NOR gate U117. The output of U117 is connected to the $\overline{R}$ input of flip-flop. The set ($\overline{S}$) input of the flip-flop at the input of U119 is connected to the output of hysteresis gate U120.

The NAND gates U118 and U119 have cross-coupled outputs, one ($\overline{Q}$) of which is connected to one input of U86, and to the Output Drivers 146. The Q output of the flip-flop appearing at the output of U119 is coupled to the other input of U118. The $\overline{Q}$ output of the flip-flop appearing at the output of U118 is connected to the other input of U119. The $\overline{Q}$ of the flip-flop is then connected to one input of the two input NOR gate U86. The other input of U86 is connected to D7 $\overline{Q}$ in the Autonull Circuit 142 for application of the Null Output waveform. The output of NOR gate U86 is coupled to the gate of N-channel transistor S9 whose source is connected to the resistance R4A-D in the Autonull Circuit. The drain of S9 is connected to the drain of P-channel transistor Q69 whose source is connected to Vdd and whose gate is connected to Vref 8 in the Autonull Circuit.

Conduction of switch S9 allows a 6 μA current to flow from current source Q69 to R4A-D. Transistor Q69 is a P-channel transistor of 45/12 geometry, which has its source connected to Vdd and its drain connected to the drain of transistor switch S9. Transistor switch S9, an N-channel device of 45/4 geometry, has its source connected to the upper terminal of R4A-D for return to IC ground. The gate of S9 is connected to the output of U86. The gate of Q69 is connected to the voltage reference Vref 8 in the Autonull Circuit, which is adjusted to supply a 6 μA (IST) current to the resistance R4A-D in the Autonull Circuit. The current (IST) causes a negative output current of the same amount to occur in the output of the Integrating Amplifier and insures the discharge of the capacitor C5, should there be a tendency of the Amplifier 141 to hang up at a positive saturation during this start-up period.

The overall Power On Reset process takes place in the following manner. The waveforms of greatest relevance are those provided in FIG. 12B. The output of the comparator COM 8 is assumed to be low immediately (and active as soon as any other protected circuitry) upon turn-on of the power. The output of U120 whose input is coupled to COM 8, remains low and the $\overline{POR}$ waveform is in its active low state holding the Comparator Network 142, the Modulo 6 Counter 144, and the Forward/Reverse Logic 149 in the appropriate initial states. More particularly, the flip-flops D16 and D17 of the Comparator Network 142 are set (Q high) providing a "false" commutation signal causing the Reset waveform and the Null Clock waveform to be high. The flip-flops D1, D2, D3 of the Modulo 6 Counter 144 are reset to the 000 state (Qs low) and the flip-flop D15 of the Forward/Reverse Logic 149 are returned to a state corresponding to the setting of the forward/reverse switch S1.

A further consequence of a valid low at the output of the comparator COM 8 is that the Output Drivers 146 are disabled immediately after turn-on. This condition assumes that the $\overline{S}$ input of U119 is low, the flip-flop (U118, U119) is "set" ($\overline{Q}$ output low). The $\overline{Q}$ low output of the flip-flop applies a low to the bottom output drivers BOBA, BOBB and BOBC in 146, precluding energization of the motor winding stages. These drivers remain disabled so long as the flip-flop (U118, U119) is set.

A further consequence of a low at the output of COM 8 is that a negative offset current IST is supplied to R4A–D in the Autonull Circuit, which is intended to facilitate the Integrating Amplifier's discharge of C5 below the 3 volt threshold of comparator COM 2 when it is connected by U85 to reset and charge capacitor C5. The $\overline{Q}$ low output of the threshold of flip-flop (U118, U119) is also coupled to one input of the NOR gate U86, which has a high due to the Null Output waveform on the other input. The output of U86 is therefore low, causing transitor switch S9 to remain off until the initial Autonull (and next four) periods are over. The Autonull period is defined to be the interval between the moment when the Null Clock waveform goes high (at power on) and when the Null Output waveform goes low.

During the continuation of the active low of $\overline{POR}$ waveform, the states indicated above are maintained. In addition, the capacitor C5, which influences the state of the comparators COM 1, COM 2 and COM 3, is normally discharged at the start of energization, and is not likely to significantly charge for the duration of the active low of the $\overline{POR}$ waveform. During this time the capacitor C5 is disconnected from the amplifier output since U85 is open because the Null Output waveform is high. As soon as Vdd exceeds 4 or 5 volts and the Amplifier is active, its output will swing to the positive saturation limit since the Autonull Circuit is now supplying it maximum positive offset current (IST is off). This will cause Nullset to go low and remain low until after $\overline{POR}$ goes high and a null is detected.

When the $\overline{POR}$ waveform goes to an inactive high, the forced sets and resets are removed and the Modulo 6 Counter and Autonull Circuits are free to function in a more conventional repeating manner for the next four periods.

After the initial Autonull period has concluded (Null Out low), S9 turns on supplying current IST to R4A-D. In respect to the Modulo 6 Counter, the CS5 waveform is NOR'd (U115) with the D14 $\overline{Q}$ output from the Forward/Reverse Logic, which is high in the reverse direction, disabling U115. The $\overline{CS1}$ waveform is NOR'd (U116) with the D14 Q output. If the Forward/Reverse Logic is operating in a forward sense, then D14 Q is high, disabling U116. If the Forward/Reverse Logic is operating in a reverse sense, then D14 $\overline{Q}$ is high, U115 is disabled and U116 is enabled. Initially, $\overline{CS0}$ is active and $\overline{CS5}$ goes high. This is true for five counts, until $\overline{CS5}$ goes low. When $\overline{CS5}$ goes low, the output of U115 goes high, forcing the output of U117 low, resetting the flip-flop U118, U119, turning off the current IST.

The addition of IST assures that the amplifier offset current remains negative during the time before Vdd has stabilized. The similar POR output waveform I start, which lasts for a five commutation count duration, but is not interrupted during nulling, is coupled to prevent the application of power to the motor until five commutations have occurred.

The protection circuit gives the Autonull circuit five counts to stabilize, and insures adequate (negative) integration current to discharge the timing capacitor C5 should the Amplifier drift toward saturation in this interval.

The protection circuit acts on behalf of the control circuit, and the power switches and, as earlier noted, operates both during power up and power down.

Upon turn on (POR active) the Amplifier 141 is disconnected from the integrating capacitor C5, due to the high on D7 $\overline{Q}$. Nulling of the Amplifier is initiated when the POR goes to an inactive state. After nulling, the Amplifier is connected for the first time to C5. The circuit thus insures that nulling will occur as the POR goes inactive and that the Amplifier will not be allowed to affect the timing until it is nulled.

What is claimed is:

1. In a motor control circuit for an electronically commutated reversible motor adapted to be energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of sequence, and wherein in said given state at least one other winding stage is energized in the appropriate sense to cause relative rotation, the combination comprising power input terminals for connection to a power supply suitable for motor operation;

first adjustable voltage reduction means for serially connecting a motor via said input terminals to the power supply to provide a variable output voltage suitable for variable speed or torque operation;

means for producing a substantially smooth control voltage dependent on said variable output voltage, said control voltage, upon passing through an intermediate value corresponding to a useful limit of said adjustable means, continuing monotonically toward a final value, and means responsive to a value of said control voltage between said intermediate and final values for generating a signal for changing the direction of motor rotation.

2. The combination set forth in claim 1 wherein said intermediate value of control voltage corresponds to desired minimum motor speed or torque, said change in direction occurring toward minimum output voltage.

3. The combination set forth in claim 1 wherein said intermediate value of control voltage corresponds approximately to motor stalling, said change in direction occurring toward minimum output voltage.

4. The combination set forth in claim 3 wherein means are provided to interrupt energization of said motor for a short time when the direction of rotation is changed.

5. In a motor control circuit for an electronically commutated reversible motor adapted to be energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, the combination comprising power input terminals for connection to a power supply suitable for motor operation;

first adjustable voltage reduction means for serially connecting a motor via said input terminals to the power supply to provide a variable output voltage suitable for variable speed or torque operation;

means for producing a substantially smooth control voltage dependent on said variable output voltage, said control voltage, upon passing through an intermediate value corresponding to a minimum useful setting of said adjustable means, continuing monotonically toward a final value, and control logic means comprising energy control means responsive to said control voltage for adjustment of the rate at which electrical energy is supplied from the supply to the motor for determining motor speed or torque, and motor direction control means responsive to a value of said control voltage between said intermediate and final values to generate a signal for changing motor direction.

6. The combination set forth in claim 5 wherein means are provided to interrupt energization of said motor for a short time when the direction of rotation is changed.

7. In a motor control circuit for an electronically commutated reversible motor adapted to be energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, the combination comprising power input terminals for connection to a power supply suitable for motor operation;

first adjustable voltage reduction means for serially connecting a motor via said input terminals to the power supply to provide a variable output voltage suitable for variable speed or torque operation;

means for producing a substantially smooth control voltage, dependent on said variable output voltage said control voltage, upon passing through an intermediate value, continuing toward a final value, and control logic means comprising a pulse width modulator responsive to said control voltage for adjustment of the rate at which electrical energy is supplied from the supply to the motor for determining motor speed or torque, and motor direction control means responsive to a value of said control voltage between said intermediate and final values to generate a control signal for changing motor direction.

8. The combination set forth in claim 7 wherein said pulse width modulator produces output pulses of constant repetition rate, said repetition rate being high in relation to the commutation rate, said electrical energy being supplied to the motor during the active on time of said pulses.

9. The combination set forth in claim 8 wherein a portion of said control circuit is energized by said output voltage and requires a predetermined value for proper operation, and wherein said pulse width modulator produces a reduction in active on time of said pulses adequate to produce a minimum desired motor speed or torque before said output voltage falls below said predetermined value.

10. The combination set forth in claim 8 wherein a portion of said control circuit is energized by said output voltage and requires a predetermined value for proper operation, and wherein said pulse width modulator produces a reduction in active on time of said pulses substantially adequate to produce motor stalling before said output voltage falls below said predetermined value.

11. In a motor control circuit for an electronically commutated reversible motor adapted to be energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, the combination comprising power input terminals for connection to a power supply suitable for motor operation;

first adjustable voltage reduction means for serially connecting a motor, and a portion of said control circuit connected in parallel with said motor, via said input terminals to the power supply to provide a variable output voltage suitable for variable speed or torque operation of the motor, the minimum output voltage being adequate for control circuit energization, means for producing a substantially smooth control voltage dependent on said variable output voltage, said control voltage, upon passing through an intermediate value corresponding to a minimum useful setting of said adjustable means, continuing monotonically toward a final value, and control logic means comprising
  energy control means, including a pulse width modulator responsive to said control voltage for producing output pulses of constant repetition rate, said repetition rate being high in relation to the commutation rate, the energy being supplied to the motor during the active on time of said pulses, being reduced at said intermediate value of said control voltage to produce the minimum desired motor speed and torque, and
  motor direction control means responsive to a value of said control voltage between said intermediate and final values to generate a control signal for changing motor direction.

12. The combination set forth in claim 11 wherein said pulse width modulator comprises
  a waveform generator for supplying a repetitive low voltage waveform of substantially constant repetition rate, amplitude and configuration, said characteristics being substantially free of dependence on said motor, said waveform having a first slope of a first duration and a second slope of a second duration and of opposite sense to said first slope, and a repetition rate which is high in relation to the commutation rate; and
  a modulating comparator having a first input to which said repetitive voltage waveform is supplied and a second input to which said adjustable control voltage is supplied, to produce output pulses when intersections occur between said inputs, said output pulses occurring at said constant repetition rate, and having an "active" on time equal to the interval between alternate pairs of intersections.

13. The combination set forth in claim 12 wherein said motor direction control means comprises
  a reversing comparator having a first input to which said adjustable control voltage is supplied, and a second input to which a voltage reference is supplied having a value between said intermediate and final values, said reversing comparator in response to equality between inputs, generating a signal for a change in the direction of motor rotation.

14. The combination set forth in claim 13 wherein solid state switching means are provided for serially connecting said winding stages via said input terminals to the power supply, said switching means conducting to energize said winding stages in one energization sequence, and wherein
  means are provided to interrupt conduction of said switches for a short period adequate to turn off said switch(es), when the direction of motor rotation is changed, before energization of said winding stages in another energization sequence.

15. The combination set forth in claim 14 wherein said conduction interruption period is derived from said waveform generator, and exceeds one period of said repetitive low voltage waveform.

16. In a motor control circuit for an electronically commutated reversible motor adapted to be energized form a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, the combination comprising:
  power input terminals for connection to a power supply suitable for motor operation;
  first adjustable voltage reduction means for serially connecting a motor, and a portion of said control circuit connected in parallel with said motor, via said input terminals to the power supply to provide a variable output voltage suitable for variable speed or torque operation of the motor, the minimum output voltage being adequate for control circuit energization;
  means for producing a substantially smooth control voltage dependent on said variable output voltage, said control voltage, upon passing through an intermediate value, continuing toward a final value, and
  control logic means comprising
    energy control means, including a pulse width modulator responsive to said control voltage for producing output pulses of constant repetition rate, said repetition rate being high in relation to the commutation rate, the energy being supplied to the motor during the active on time of said pulses, being reduced at said intermediate value of said control voltage to produce the minimum desired motor speed and torque, and
    motor direction control means having a first input coupled to a reversing comparator for response to a value of said control voltage between said intermediate and final values for generating a signal for changing the direction of motor rotation, and
    a second input coupled to a switch for generating a signal for controlling the direction of motor rotation.

17. The combination set forth in claim 16 wherein means are provided to interrupt energization of said motor for a short time when the direction of rotation is changed.

18. The combination set forth in claim 16 wherein solid state switching means are provided for serially connecting said winding stages via said input terminals to the power supply, said switching means conducting to energize said winding stages in one energization sequence, and wherein
  means are provided to interrupt conduction of said switches for a short period adequate to turn off said switch(es), when the direction of motor rotation is changed, before energization of said winding stages in another energization sequence.

19. The combination set forth in claim 18 wherein said conduction interruption period is derived from said waveform generator, and exceeds one period of said repetitive low voltage waveform.

20. The combination set forth in claim 18 wherein said motor direction control means has a dual output
  one output having an active state for facilitating clockwise motor rotation, and a
  second output having an active state for facilitating counterclockwise motor rotation, the two active output states never occurring simultaneously and wherein said means for interrupting conduction of said switch, produces said interruption by maintaining both output states inactive for the interruption period.

21. The combination set forth in claim 20 wherein second voltage reduction means is provided, coupling the portion of said control circuit in parallel with said motor via said input terminals to the supply, and establishing low voltage dc supply for said control circuit portion, the voltage of said low voltage dc supply changing at a finite rate when power is applied or removed; and a protection circuit producing an output responsive to the voltage of said low voltage dc supply and when said voltage has exceeded a first value as power is turned on, releasing said motor direction control means in an output state determined by the setting of said switch, said first value being set such that normal circuit operation is assured at low voltage supply voltages exceeding said value.

22. The method of controlling an electronically commutated reversible motor energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, comprising reducing the output voltage supplied to the motor through a range of values suitable for variable speed or torque operation, producing a substantially smooth control voltage dependent on said variable output voltage, said control voltage, upon passing through an intermediate value corresponding to a minimum useful reduction, continuing monotonically toward a final value, and generating a signal for changing the direction of motor rotation at a value of the control voltage between said intermediate and final values.

23. The method of controlling an electronically commutated reversible motor energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, comprising reducing the output voltage supplied to the motor through a range of values suitable for variable speed or torque operation, by means of a first adjustable voltage reduction means serially connecting the motor to a power supply producing a substantially smooth control voltage dependent on said variable output voltage, said control voltage, upon passing through an intermediate value corresponding to a minimum useful setting of said adjustable means, continuing monotonically toward a final value, and generating a signal for changing the direction of motor rotation at a value of the control voltage between said intermediate and final values.

24. The method of controlling an electronically commutated reversible motor energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, comprising reducing the output voltage supplied to the motor through a range of values suitable for variable speed or torque operation by means of a first adjustable voltage reduction means serially connecting the motor to a power supply producing a substantially smooth control voltage dependent on said variable output voltage, said control voltage, upon passing through an intermediate value, continuing monotonically toward a final value, enhancing the rate of downward adjustment in energy per unit change in output voltage supplied to the motor and thereby reducing said range of values by means of a pulse width modulator for producing output pulses of high repetition rate in relation to the commutation rate whose on time, during which energy is supplied to said motor, is responsive to said control voltage, said intermediate values corresponding to a minimum useful setting of said adjustable means, and generating a signal for changing the direction of motor rotation at a value of the control voltage between said intermediate and final values.

25. The method of controlling an electronically commutated reversible motor energized from a power source, said motor having a multistage winding assembly, and a magnetic assembly, the two arranged for mutual relative rotation, said motor in a given state of a multistate energization sequence having an unenergized winding stage in which an induced back emf is integrated over time to determine the instant at which the mutual relative angular position has been attained suitable for commutation to the next state of the sequence, and wherein in said given state at least one other winding stage is energized in the appropriate sense to cause relative rotation, comprising reducing the output voltage supplied to the motor through a range of values suitable for variable speed or torque operation by means of a first adjustable voltage reduction means serially connecting the motor to a power supply producing a substantially smooth control voltage dependent on said variable output voltage, said control voltage, upon passing through an intermediate value, continuing monotonically toward a final value, enhancing the rate of downward adjustment in energy per unit voltage supplied to the motor and thereby reducing said range of values by means of a pulse width modulator for producing output pulses at high repetition rate in relation to the commutation rate whose on time, during which energy is supplied to said motor, is responsive to said control voltage, said intermediate values corresponding to a minimum useful setting of said adjustable means, generating a signal for suspending the energization for motor rotation in one sense at a value of the control voltage between said intermediate and final values, and after a short interruption for protection of motor switches, generating a signal for motor rotation in an opposite sense.

* * * * *